(12) United States Patent
Malamud et al.

(10) Patent No.: US 6,606,101 B1
(45) Date of Patent: Aug. 12, 2003

(54) INFORMATION POINTERS

(75) Inventors: Mark A. Malamud, Seattle, WA (US); John E. Elsbree, Redmond, WA (US); Erik A. Gavriluk, Seattle, WA (US); David Barnes, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/234,624

(22) Filed: Jan. 21, 1999

Related U.S. Application Data

(63) Continuation-in-part of application No. 08/354,267, filed on Dec. 12, 1994, now abandoned, which is a continuation of application No. 08/146,931, filed on Oct. 25, 1993, now abandoned.

(51) Int. Cl.⁷ .......................... G09G 5/08; G06F 15/62
(52) U.S. Cl. .................. 345/715; 345/705; 345/473; 345/809; 345/861
(58) Field of Search .................. 345/473, 347, 345/340, 348, 349, 352, 353, 354, 145, 156, 157, 163, 715, 856, 705–709, 825, 711, 861, 714, 727, 809, 788, 810

(56) References Cited

U.S. PATENT DOCUMENTS

| | | | | |
|---|---|---|---|---|
| 4,931,783 A | * | 6/1990 | Atkinson .................... | 345/163 |
| 5,021,976 A | * | 6/1991 | Wexelblat et al. ......... | 364/521 |
| 5,140,677 A | * | 8/1992 | Fleming et al. ............ | 395/159 |
| 5,169,342 A | * | 12/1992 | Steele et al. ................ | 434/112 |
| 5,287,448 A | * | 2/1994 | Nicol et al. ................. | 395/159 |
| 5,339,392 A | * | 8/1994 | Risberg et al. ............. | 345/333 |
| 5,388,993 A | * | 2/1995 | McKiel et al. .............. | 434/118 |
| 5,428,733 A | * | 6/1995 | Carr ........................... | 395/342 |
| 5,434,965 A | * | 7/1995 | Matheny et al. ............ | 395/338 |
| 5,448,695 A | * | 9/1995 | Douglas et al. ............ | 395/155 |
| 5,479,602 A | * | 12/1995 | Baecker et al. ............ | 395/349 |
| 5,530,865 A | * | 6/1996 | Owens et al. ............... | 395/700 |
| 5,590,264 A | * | 12/1996 | Keane et al. ............... | 395/340 |
| 5,914,717 A | * | 6/1999 | Kleewein et al. ........... | 345/352 |
| 5,943,053 A | * | 8/1999 | Ludolph et al. ............ | 345/342 |
| 6,437,800 B1 | * | 8/2002 | Malamud et al. ........... | 345/711 |

OTHER PUBLICATIONS

<<Inside Macintosh>> vol. I 11–3–11–10; Apple Computer Inc. 1991.*

* cited by examiner

*Primary Examiner*—Lun-Yi Lao
(74) *Attorney, Agent, or Firm*—Christensen O'Connor Johnson Kindness PLLC

(57) ABSTRACT

A system supports the use of information pointers. The information pointers provide audio and/or visual information about objects to which the cursors point. For instance, an information cursor may provide output specifying the name of an object to which the cursor points. In addition to information about the object pointed to by the cursor, information windows provide information about the user's interaction with the object. For example, "Deleting Source File." Information windows may contain information pertaining to a pair of objects, such as the source and target object in a drag and drop operation, or to a collection of objects.

2 Claims, 40 Drawing Sheets

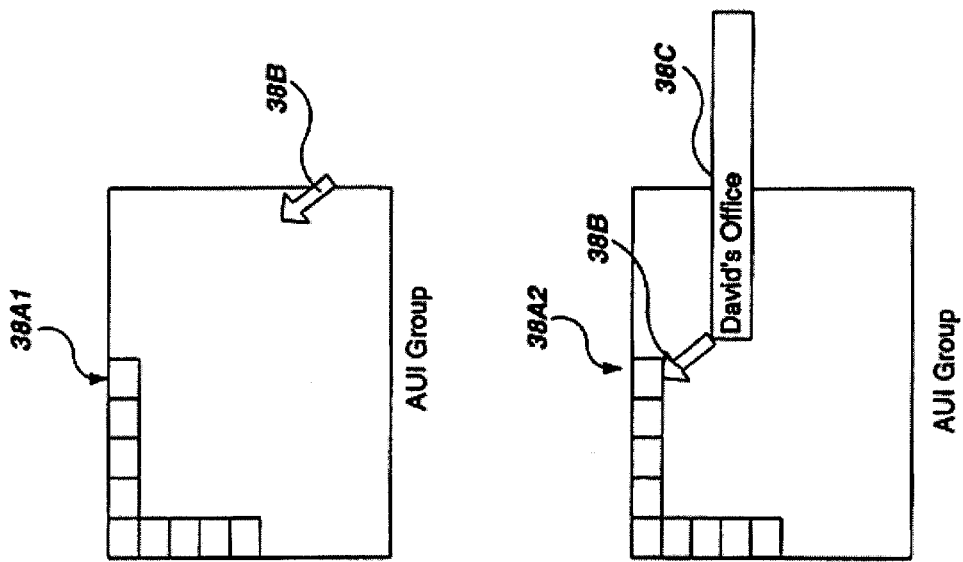
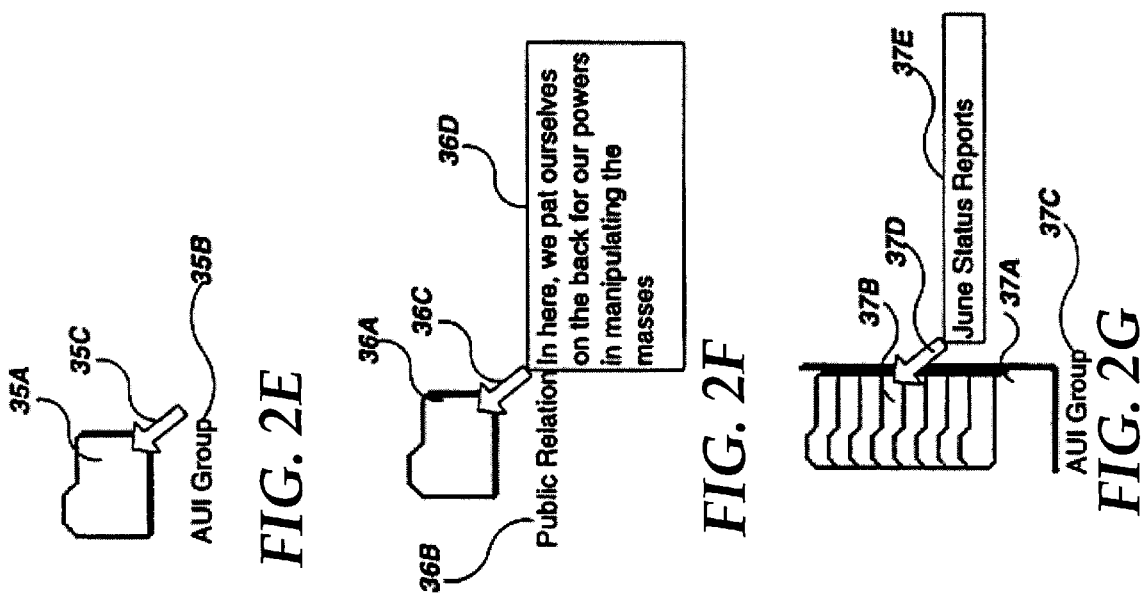
FIG. 2H
FIG. 2E
FIG. 2F
FIG. 2G

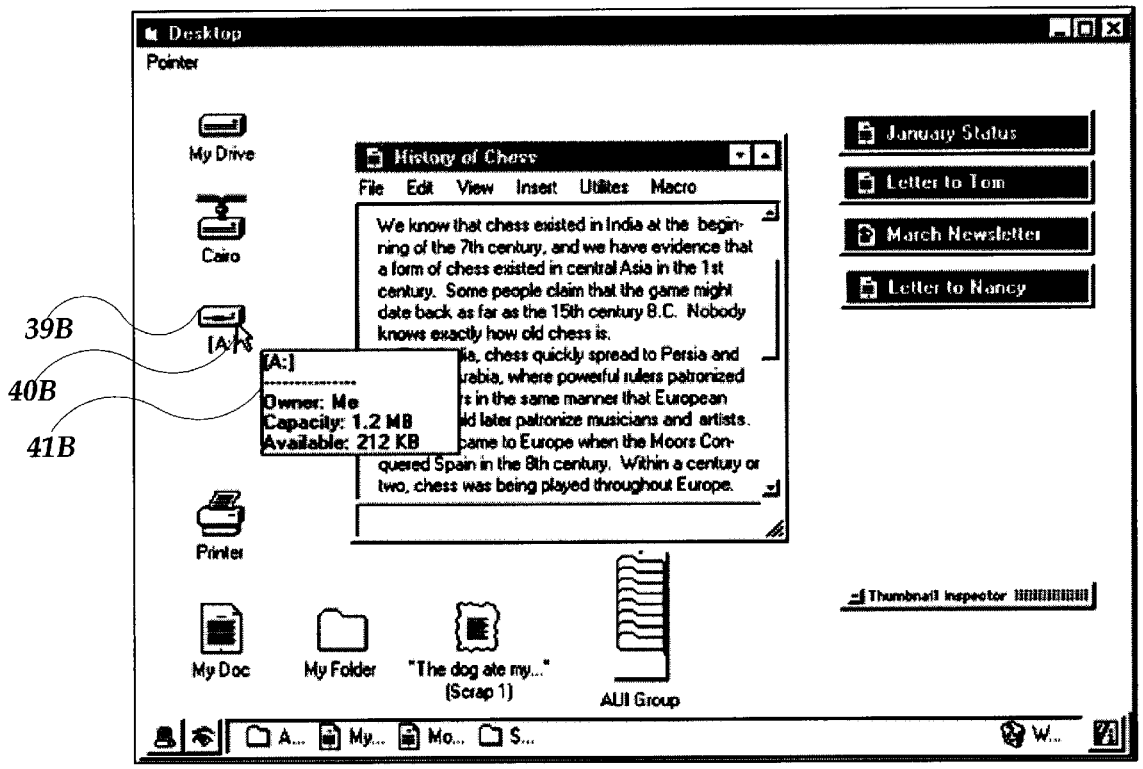
FIG. 2J1

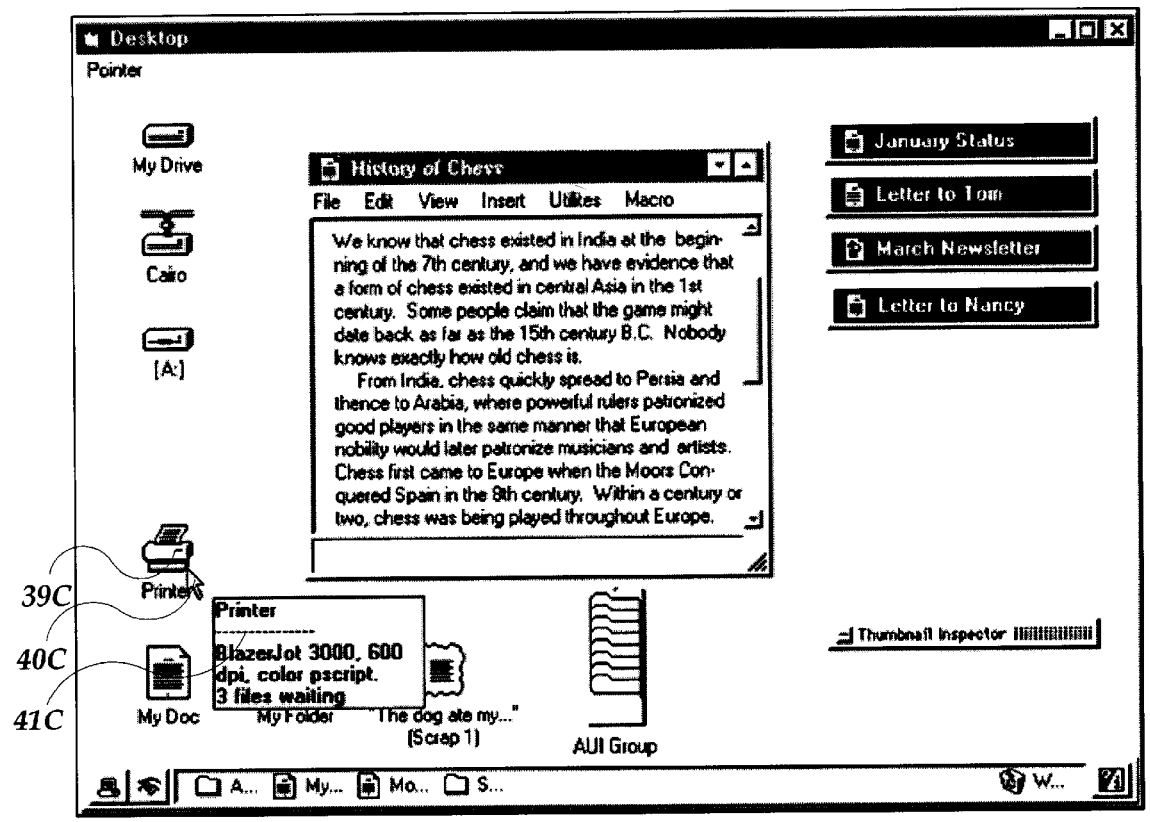
FIG. 2J2

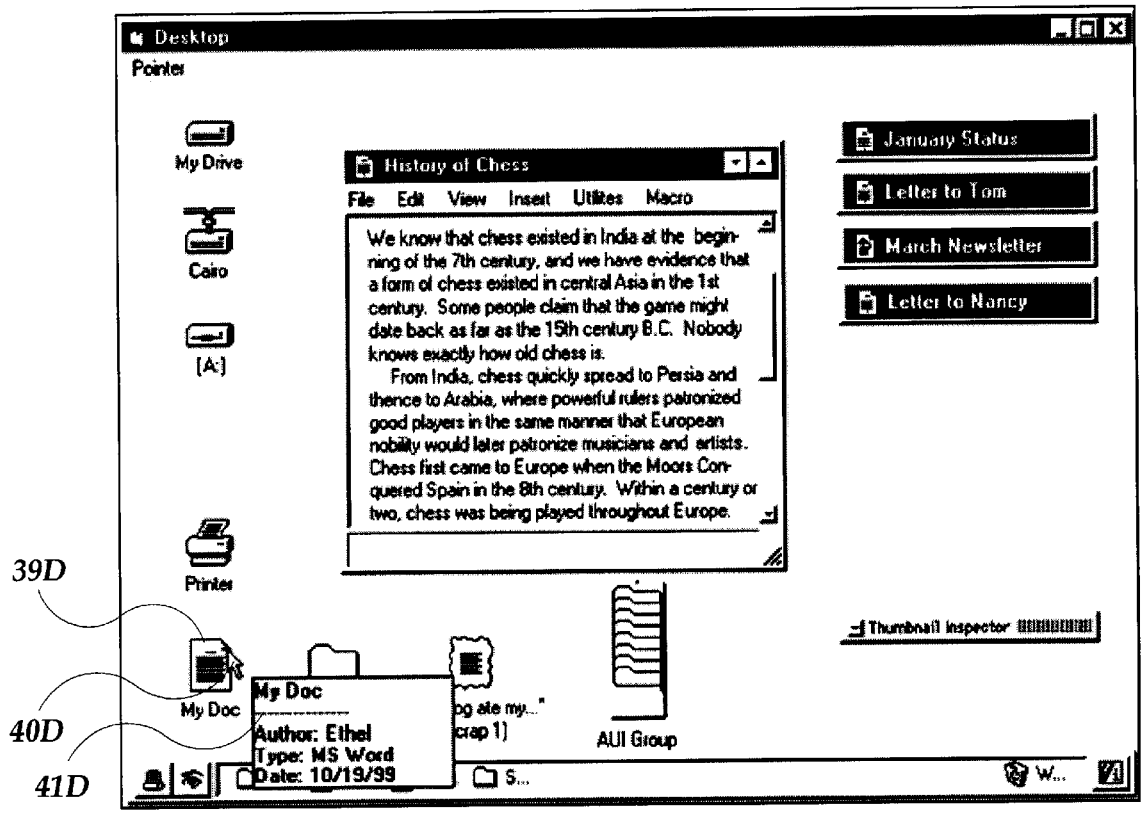
FIG. 2K1

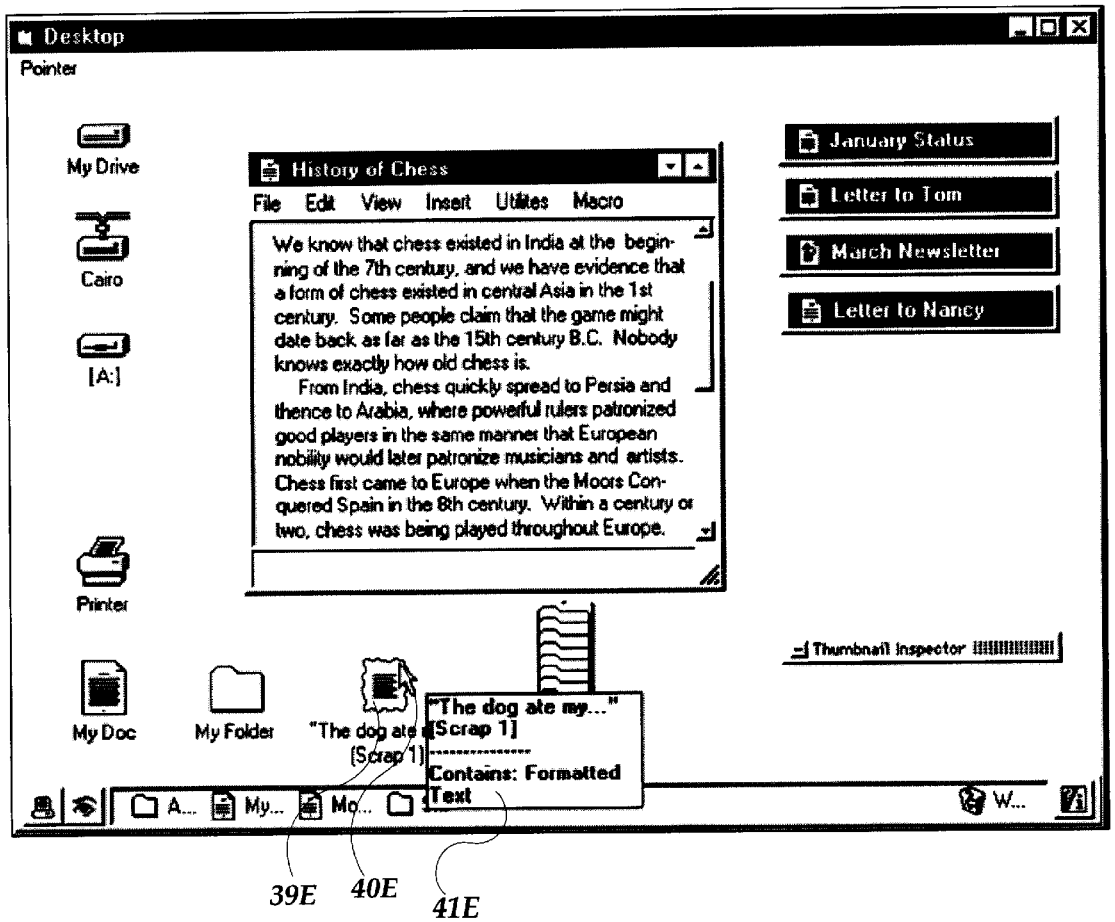
FIG. 2K2

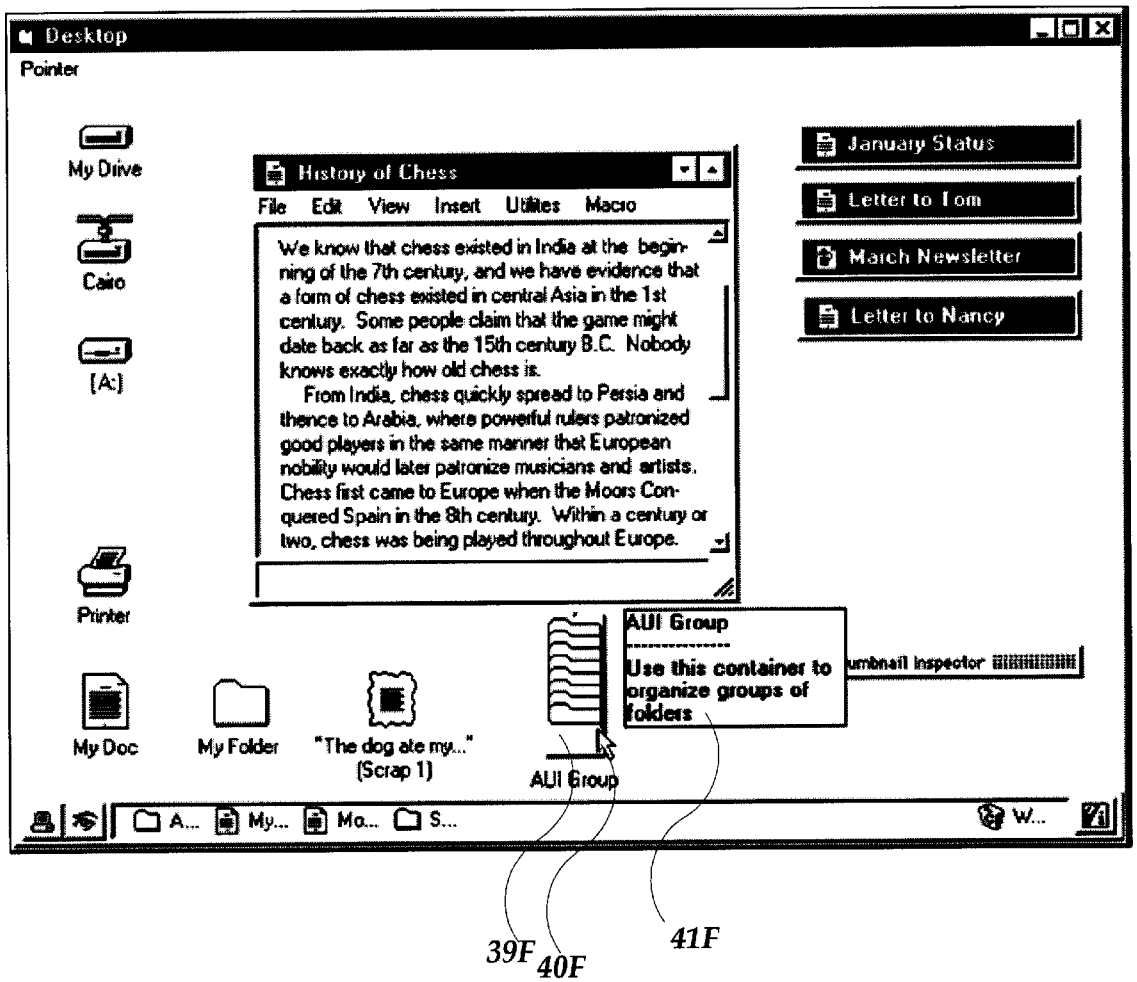
FIG. 2L1

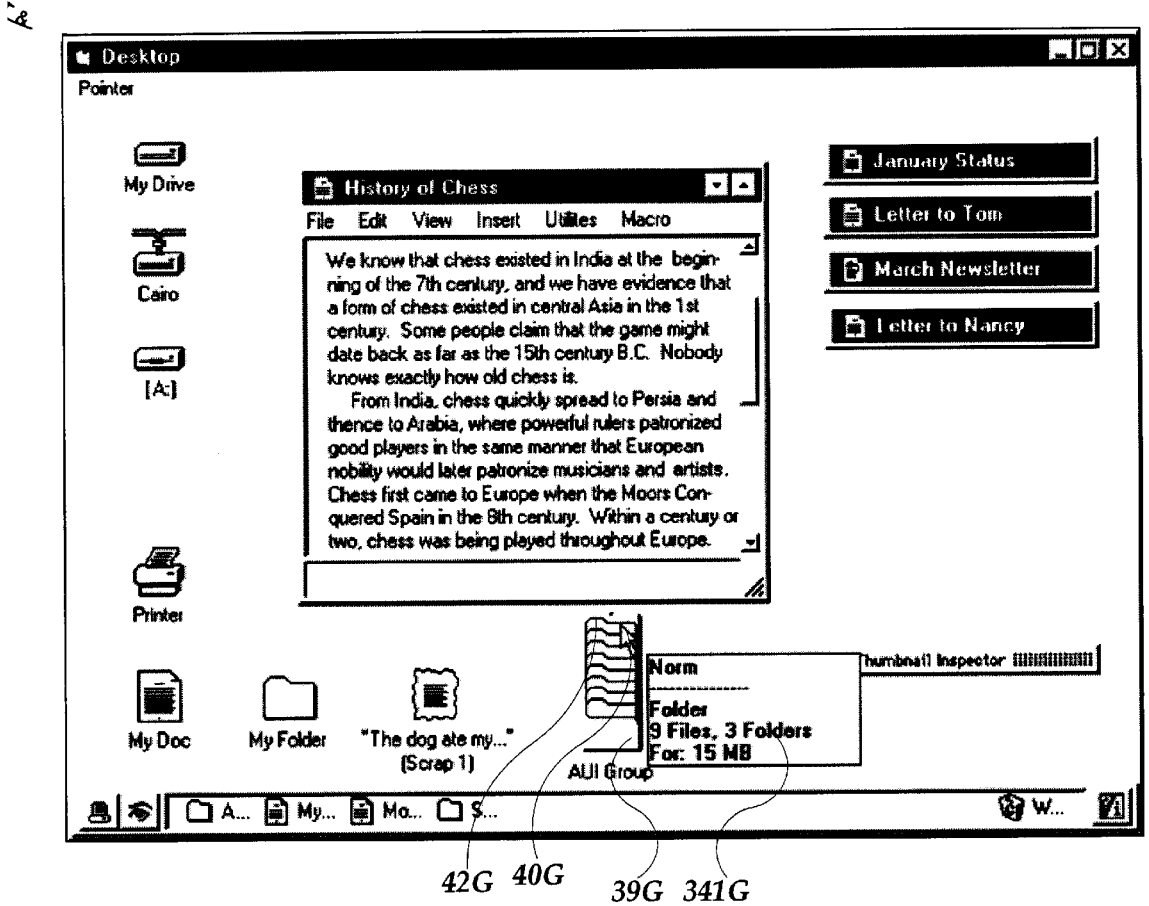
FIG. 2L2

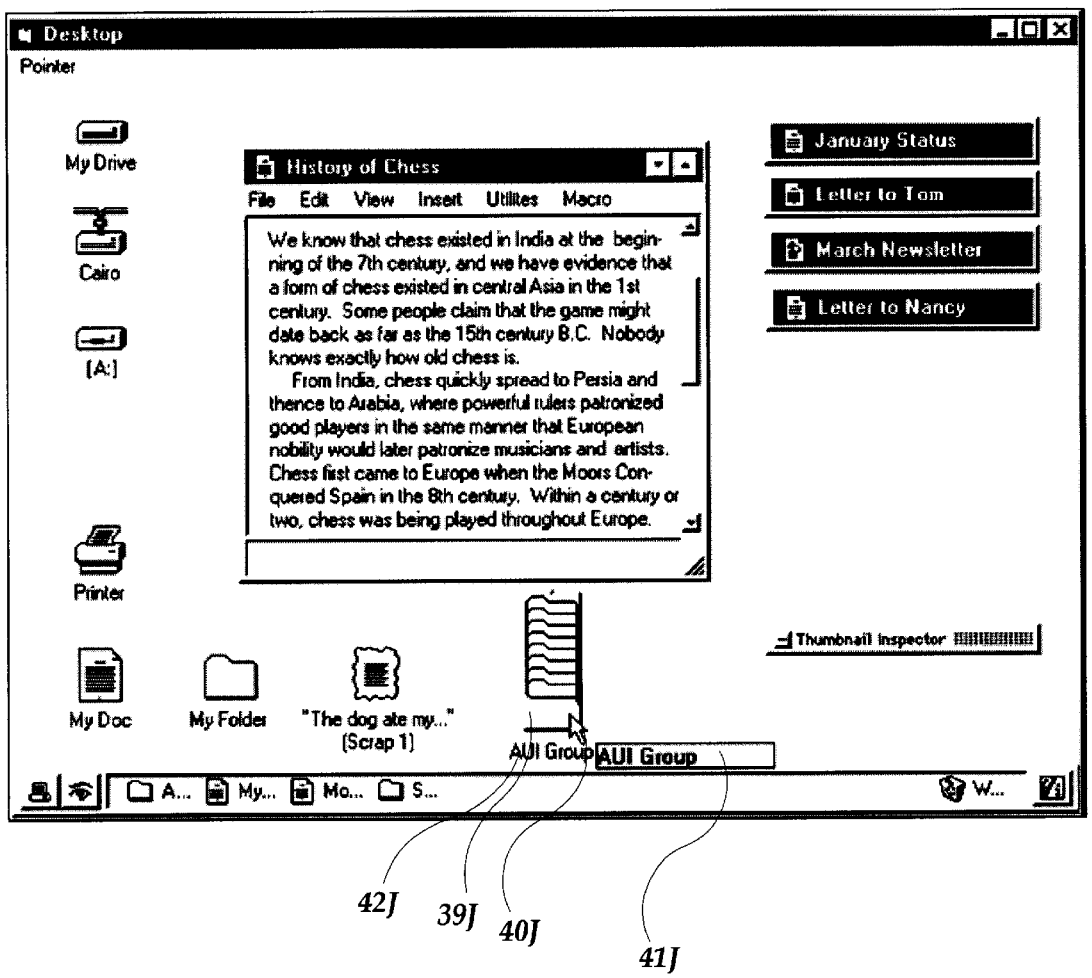
FIG. 2P1

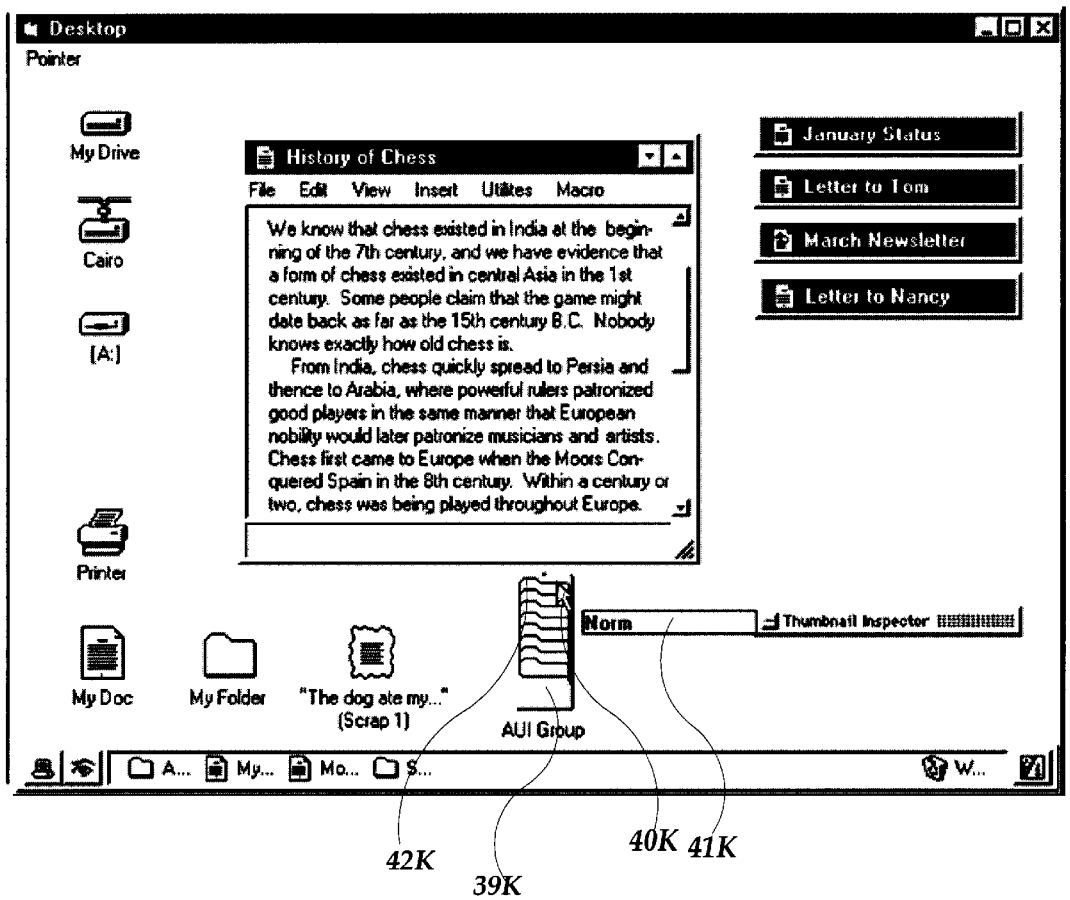
FIG. 2P2

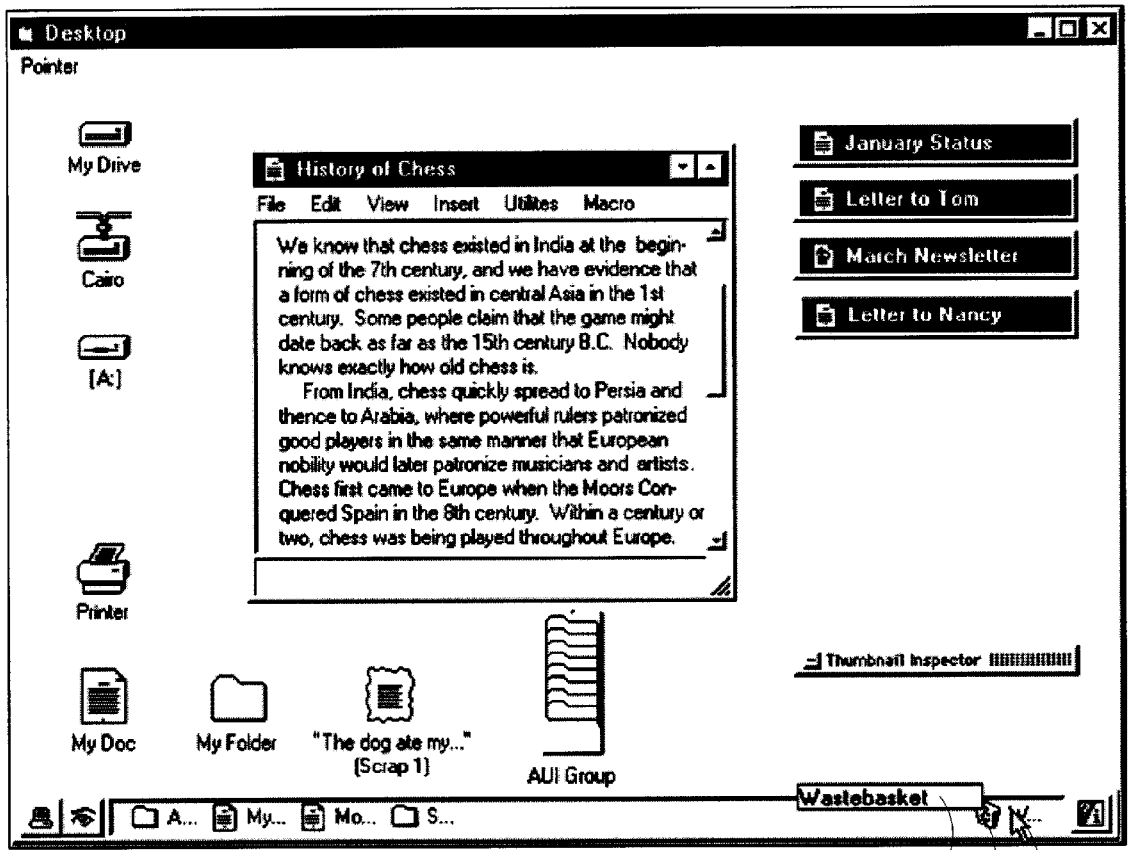
*FIG. 2P3*

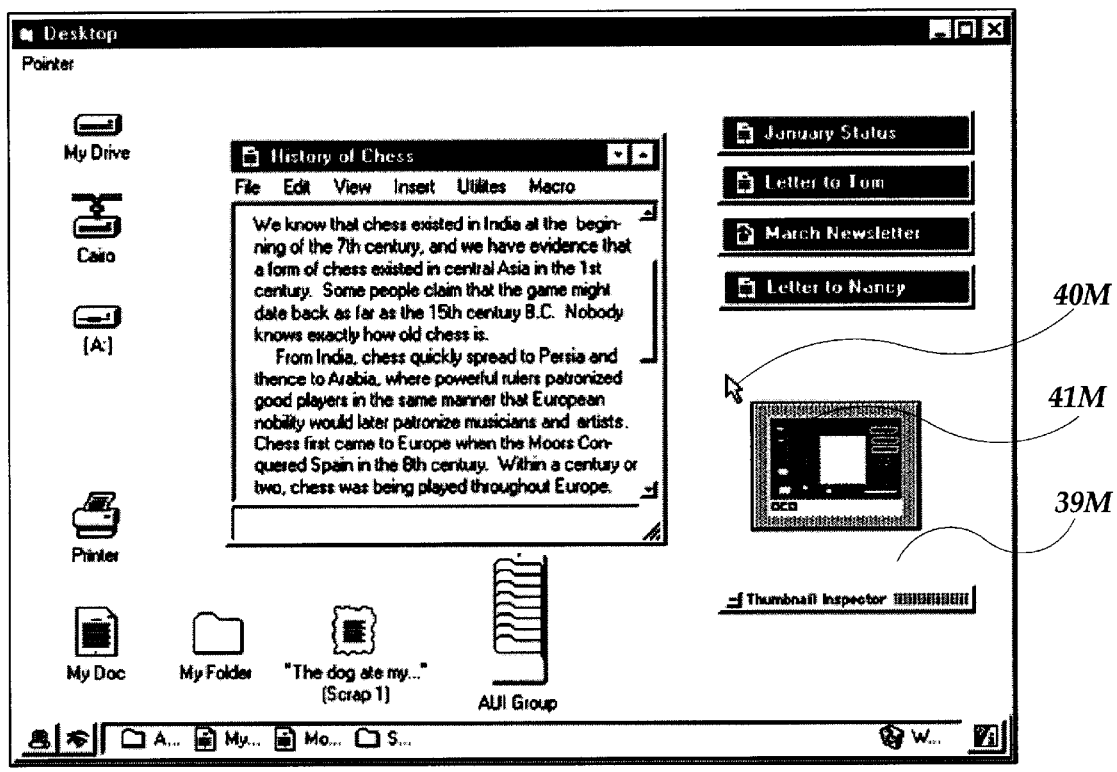
FIG. 2Q1

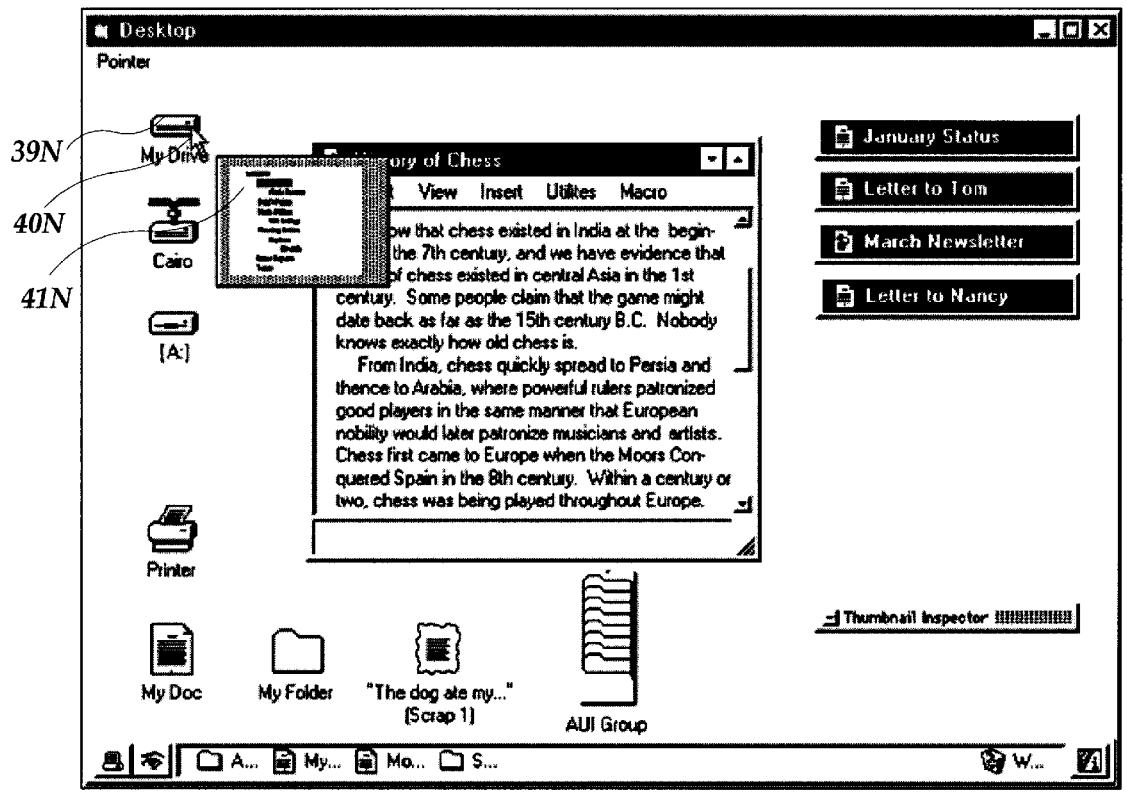
FIG. 2Q2

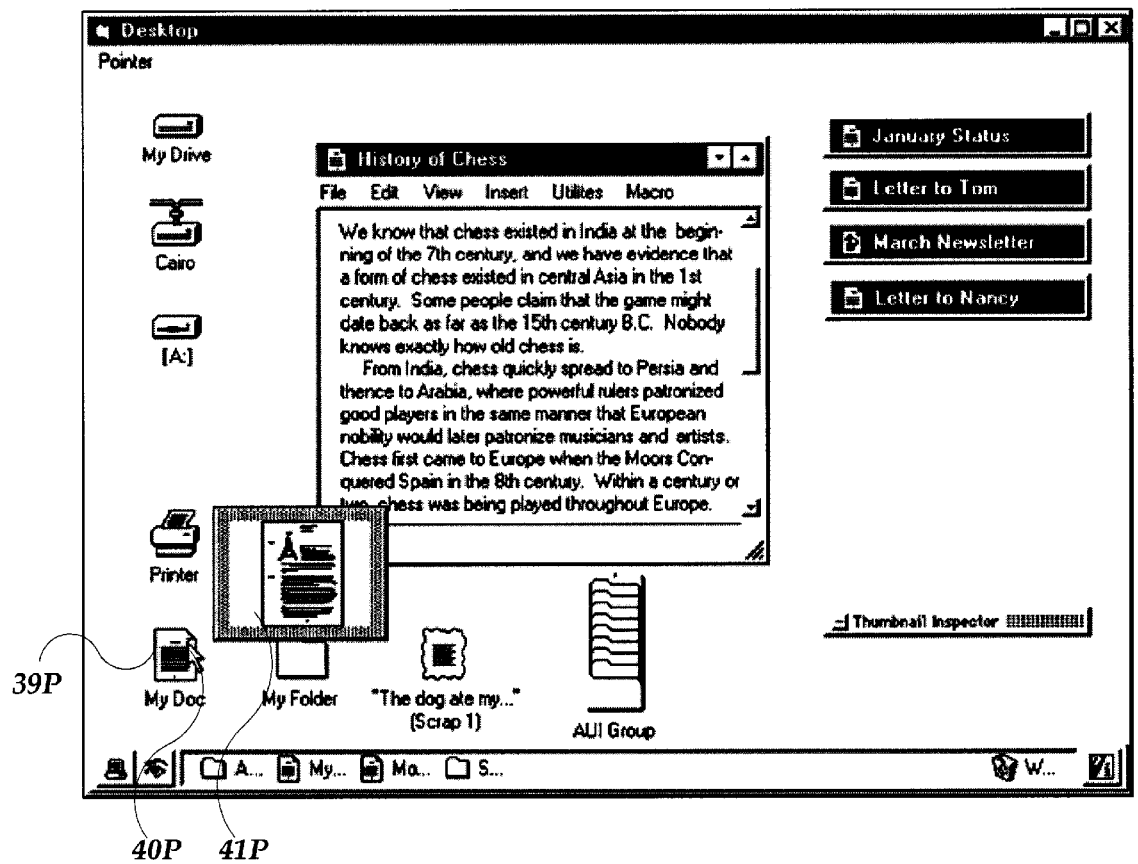
FIG. 2Q3

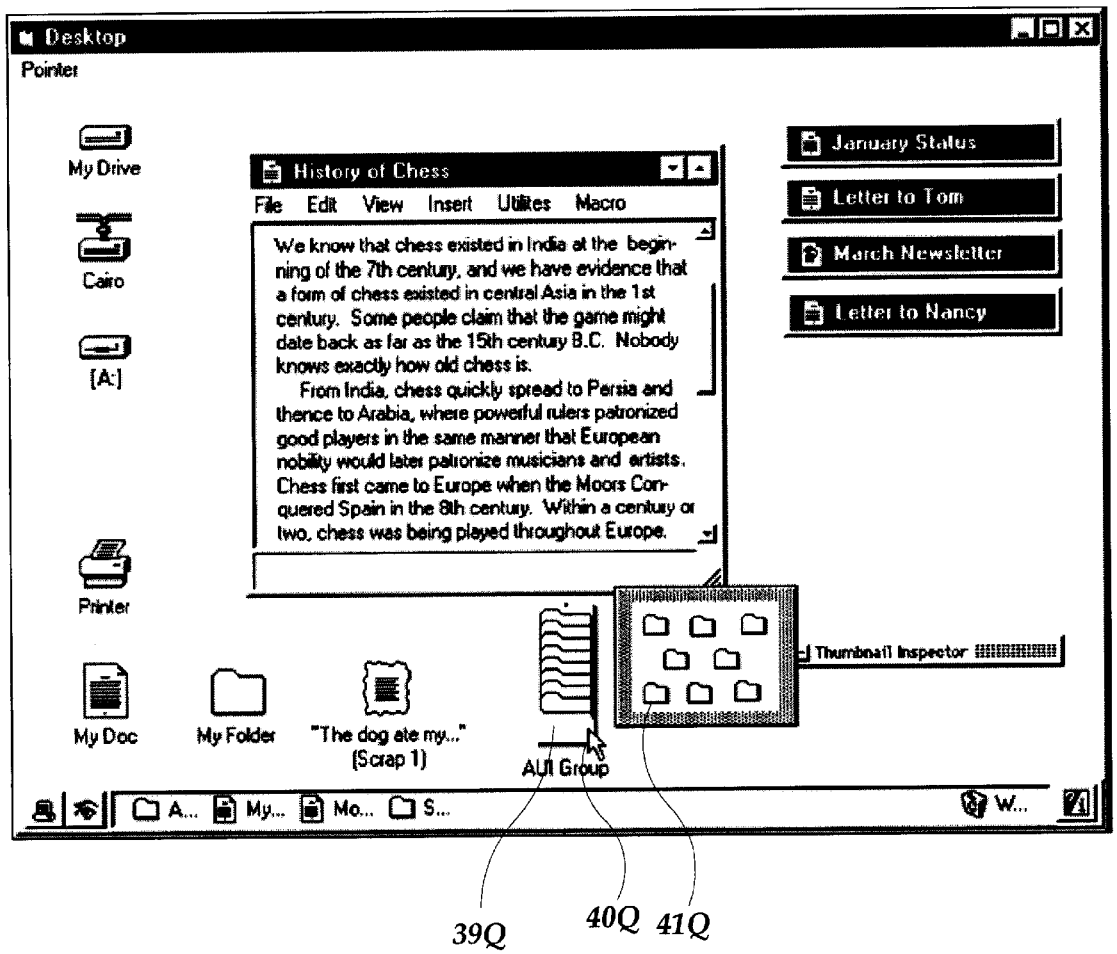
FIG. 2Q4

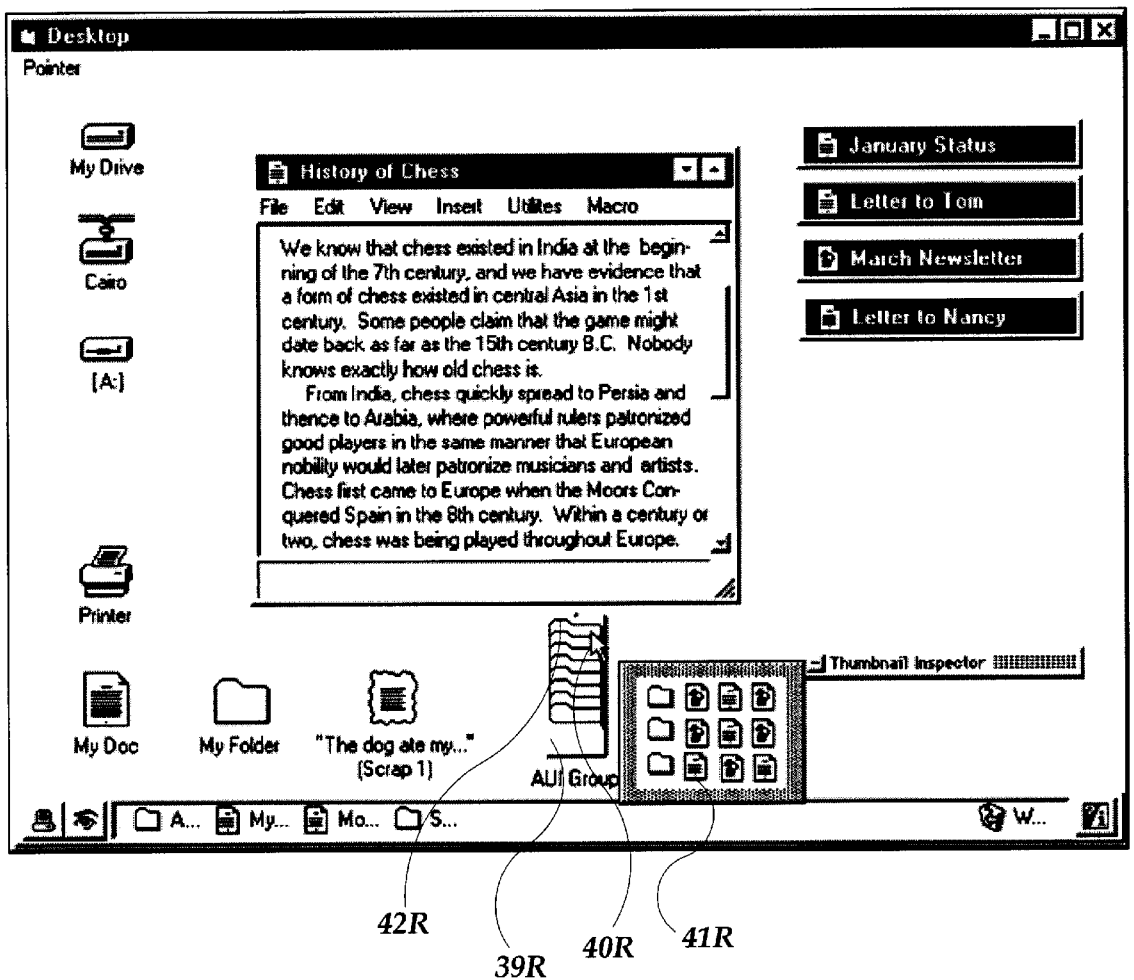
FIG. 2Q5

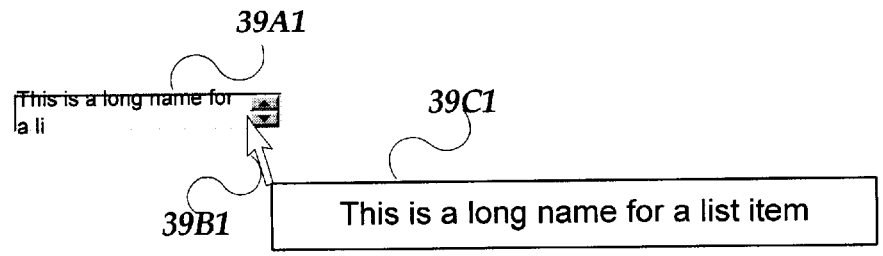
FIG. 2R1
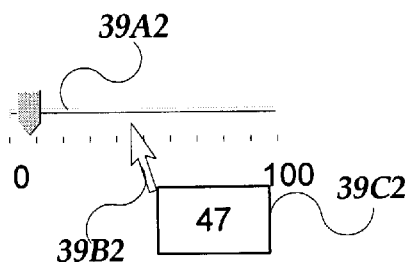
FIG. 2R2
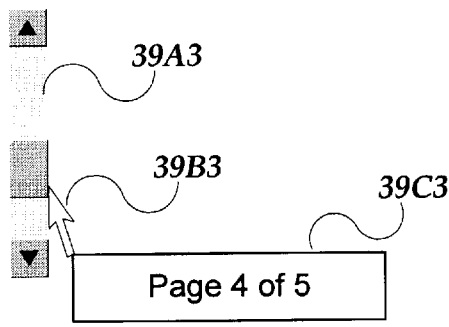
FIG. 2R3
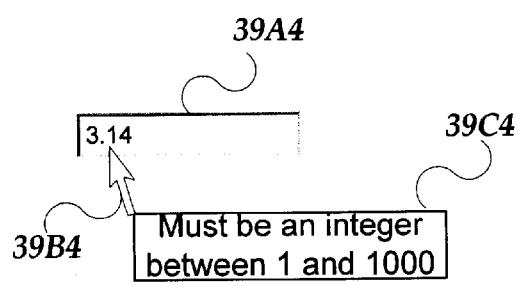
FIG. 2R4

INFORMATION POINTERS

CROSS-REFERENCE TO RELATED APPLICATIONS

This application is a continuation-in-part of U.S. patent application No. 08/354,267, filed Dec. 12, 1994, now abandoned, which is a continuation of U.S. patent application No. 08/146,931, filed Oct. 25, 1993, also abandoned, priority from the filing date of which is claimed under 35 U.S.C. § 120.

FIELD OF THE INVENTION

The present invention relates generally to data processing systems and, more particularly, to display of objects on video displays in data processing systems.

BACKGROUND OF THE INVENTION

Many operating systems provide a cursor that indicates a current position on a video display. The cursor is generally manipulable by an input device, such as a keyboard or a mouse. In certain operating systems, such as the Microsoft WINDOWS, version 3.1, operating system, which is sold by Microsoft Corporation of Redmond, Washington, a window may have a status bar that displays information about the object to which the cursor is currently pointing. As the cursor is moved to point at different objects, the contents of the status bar changes accordingly. The status bar is a separate graphic entity that is not connected to the cursor and does not move with the cursor. The status bar is positioned on the video display at a fixed location within a window. As such, a user has to look at two separate portions of the screen if he wishes to view both the cursor and the status bar. This separation of the status bar from the cursor can be confusing and burdensome to the user.

Some operating systems provide static context sensitive help. Static context sensitive help provides static help information about an object. The help information is displayed at a static screen location near the object with which the static context sensitive help is associated. An example of static context sensitive help is Balloon Help described in Inside Macintosh® Volume VI pp. 11–3 to 11–10. Static context sensitive help information is limited to what the user can do. Static context sensitive help information does not give the user any information about what the user is currently doing or what the user is about to do.

SUMMARY OF THE INVENTION

The limitations associated with the use of a status bar and static context sensitive help are overcome by the present invention. The present invention brings the object or action, the pointer (i.e., cursor), and the information into close proximity. In accordance with a first aspect of the present invention, a method is practiced in a data processing system having a video display, an output device and an input device. In this method, objects, including a cursor, are displayed on the video display. In response to a user using the input device, a selected object is designated by positioning the cursor over at least a portion of one of the objects that are displayed. If the output device is formed by the video display, textual and/or graphical information about the selected object and/or the user's interaction with the selected object is displayed in an information window adjacent to the cursor. Such information pointers can be very helpful to users.

If the output device includes an audio output device, e.g., a speaker, audio information about the selected object and/or the user's interaction with the selected object is output over the audio output device. Audio information about a selected object and/or the user's interaction with an object can be extremely beneficial to all users, but it is essential for blind users. Audio information pointers inform the user about what is happening or what is about to happen based on the user's interaction with the cursor, for example, "copying source to target," "moving source to target," or "linking target to source." Audio information pointers can also notify the user that the cursor is at an edge of the display.

If the output device includes both the video display and an audio device, information about the selected object and/or the user's interaction with the selected object can be output only on the video display, only on the audio device or on both the video display and the audio device. Irrespective of the output device(s), the information may be output either immediately after the cursor obscures a portion of the object, or after a specified "linger" period of time.

In accordance with another aspect of the present invention, a method is practiced in a data processing system having a video display, an audio output device and an input device, such as a mouse. In this method, a source object icon associated with a source object is displayed on the video display. A target object icon associated with a target object is also displayed on the video display. In response to the user using the input device, a cursor is positioned to be over at least a portion of the source object icon. In response to the cursor being over at least a portion of the source object icon, information is output about the source object. The information is output on the video display and/or the audio output device. In response to the user using the input device, the source object icon is dragged across the video display until the cursor is over at least a portion of the target object icon. In response to the cursor being over the target object icon, information is output about the target object. Information is also output about the impending action between the source and target objects. For example, "copying source to target." This method may also include the additional step of dropping the source object icon on the target object icon in response to the user using the input device.

In accordance with a further aspect of the present invention, objects are displayed on the video display and a cursor is positioned on the video display to be over at least a portion of one of the objects. In response to the cursor being positioned over a portion of at least one of the objects, a window holding information about the object which the cursor is over is displayed on the video display. The window can contain multiple types of requested information. For example, one type of requested information may be the name of the object, while another type of requested information may be the size of the object. Both pieces of information will be displayed in the window in a logical order. Alternatively, multiple windows may be associated with, and displayed adjacent to, the cursor.

In accordance with an additional aspect of the present invention, an object is displayed on the video display and a context menu for the object is displayed on the video display in response to the user using the input device. The context menu includes an option for generating an information pointers window. When the user selects the option of generating the information pointers window, the information pointers window is displayed on the video display. The information pointers window holds information about the object and/or the user's interaction with the object.

In accordance with a further aspect of the present invention, the user selects the format of the information pointer. The format may be: (i) the name of the object over which the cursor is positioned on the video display; (ii) information about the object; (iii) a graphical representation of the object, known as a preview; or (iv) any combination of the previously mentioned formats. Alternatively, the user may elect to not display an information pointer. In other words, the user may elect to display only the standard cursor.

In accordance with yet a further aspect of the present invention, the user's decision not to generate an information pointers window is overridden. The override is only applied to information deemed to be so critical in nature that it is imperative for the user to receive the information.

In accordance with yet another aspect of the present invention, an object is displayed on the video display and the object is selected in response to the user using the input device. A window holding information about the selected object is generated in response to the user using the input device. The window includes a pointer from the window to the selected object.

In accordance with a still further aspect of the present invention, a data processing system includes a video display for displaying at least one object. The data processing system also includes an input device for positioning the cursor on the video display. The data processing system further includes an audio output device for outputting audio information and an audio information generator. The audio information generator generates audio information about an object on the video display when the cursor is positioned over the object. In addition, the audio information generator forwards the audio information to the audio output device so that the audio information may be output.

In accordance with another aspect of the invention, the data processing system includes an input device in a video display for displaying objects in windows. The data processing system also includes an information window generator for generating information windows holding information about associated objects. Each information window includes a visual pointer that points to its associated object.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2E–2H illustrate several information pointers formed in accordance with the present invention that provide missing information to a user;

FIGS. 2I–2N illustrate several visual information pointers formed in accordance with the present invention that use a combination of the name and information formats to display an information pointer;

FIGS. 2P1–2P3 illustrate information pointers formed in accordance with the present invention that use the name format to display an information pointer;

FIGS. 2Q1–2Q5 illustrate information pointers formed in accordance with the present invention that use the preview format of an information pointer;

FIGS. 2R1–2R4 illustrate information pointers formed in accordance with the present invention in which the object pointed to is a dialog box control;

FIG. 3 is a flow chart showing the steps performed to implement the information pointers of the present invention;

FIG. 5 is a diagram showing an example of an information pointer called a Quick Info Window generated in accordance with the present invention;

DETAILED DESCRIPTION OF THE PREFERRED EMBODIMENT

Figure 5:
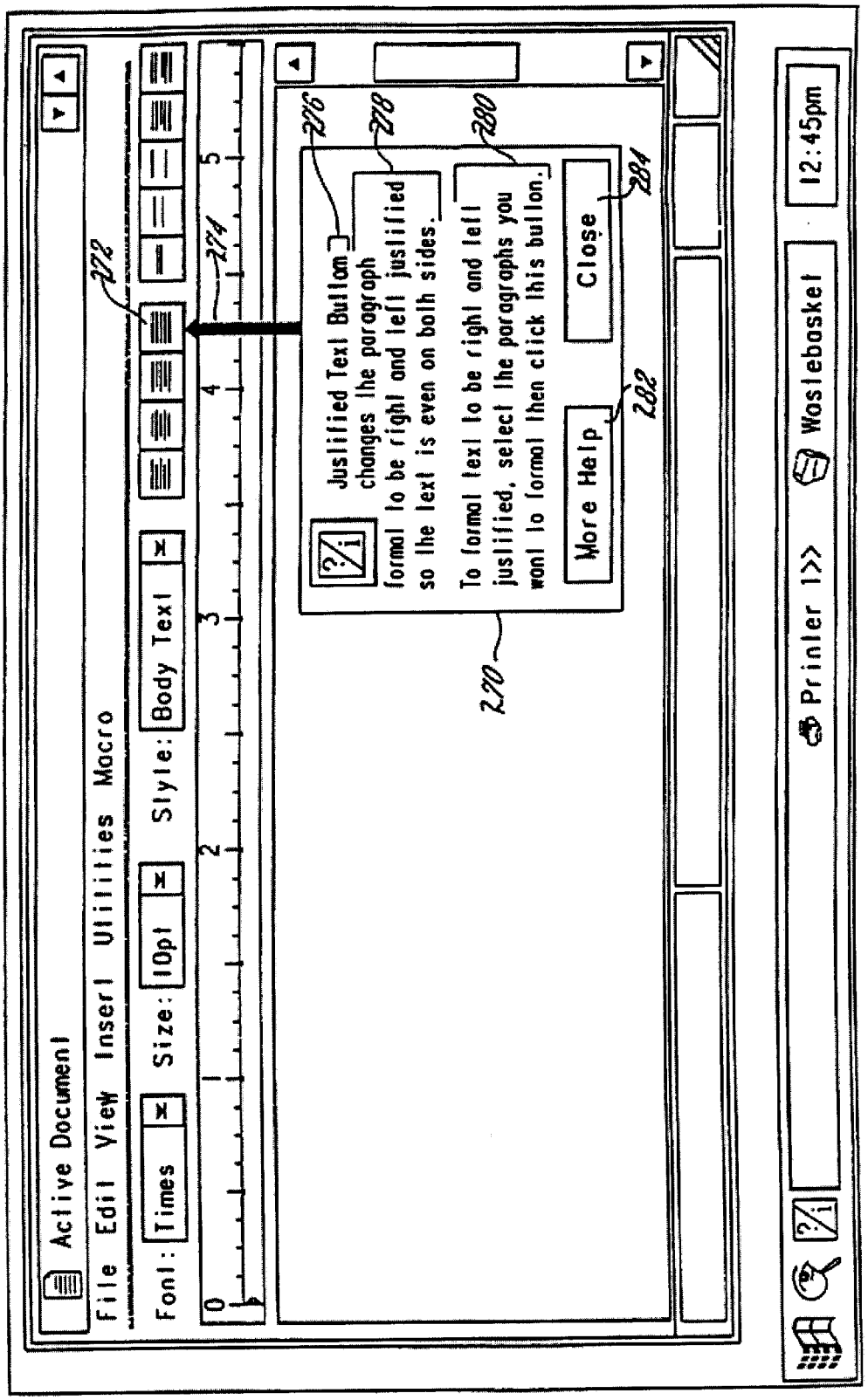

The preferred embodiment of the present invention provides "information pointers" which display graphical and/or textual information and/or output audio information about one or more objects to which the cursor points and/or the user's interaction with the object(s). Each information pointer has two portions: a pointing portion and an information portion. The pointing portion is actually a standard cursor (e.g., arrow, hourglass, etc.). The pointing portion points to a position on a video display. The information portion is just like a "normal" window. The information portion displays textual and/or graphical information and/or outputs audio information about the object and/or the user's interaction with the object to which the pointing portion points. Like a "normal" window, the graphical information can be any type of graphical information including images, full motion video, and dialog box controls. Visual information pointers are dynamic in that their shape, size and location on a video display are variable as required to efficiently display information to the user. When an information pointer is visible, only the appearance of the pointer changes, not its functionality. A user can still select, click and drag, double-click etc., with the standard pointer, the same hot spot, and with the same precision. Information pointers are made available by an operating system to applications that are run on the operating system. Information pointers are available in a number of different varieties. Information pointers included in an actual embodiment of the present invention are known as Quick Info Windows. Quick Info Windows provide information about an object selected by a user. An example of a Quick Info Window is illustrated in FIG. 5 and described below.

Figure 1:
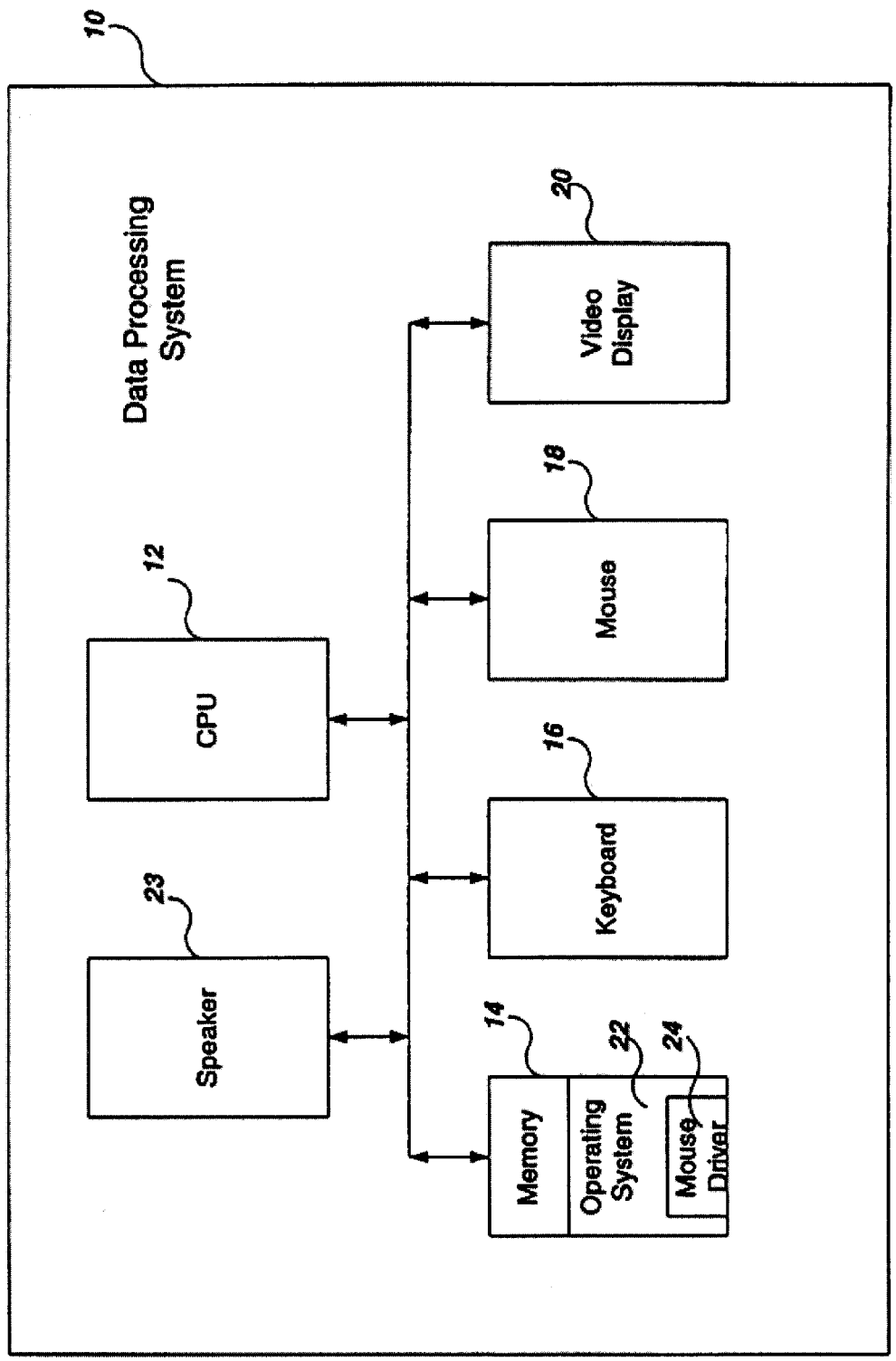
FIG. 1 is a block diagram of a data processing system for practicing the present invention.

FIG. 1 is a block diagram of a data processing system 10 that is suitable for practicing the present invention. The data processing system 10 includes a central processing unit (CPU) 12 that oversees operation of the system. The data processing system 10 also includes a memory 14, a keyboard 16, a mouse 18, a video display 20 and an audio output device, i.e., a speaker 23. The memory 14 may include different types of storage, such as RAM, ROM, or disk storage. The memory 14 holds a copy of an operating system 22. A mouse driver 24 is provided within the operating system 22 to drive the mouse 18.

Information pointers can be presented in a variety of formats.

Figure 2A:
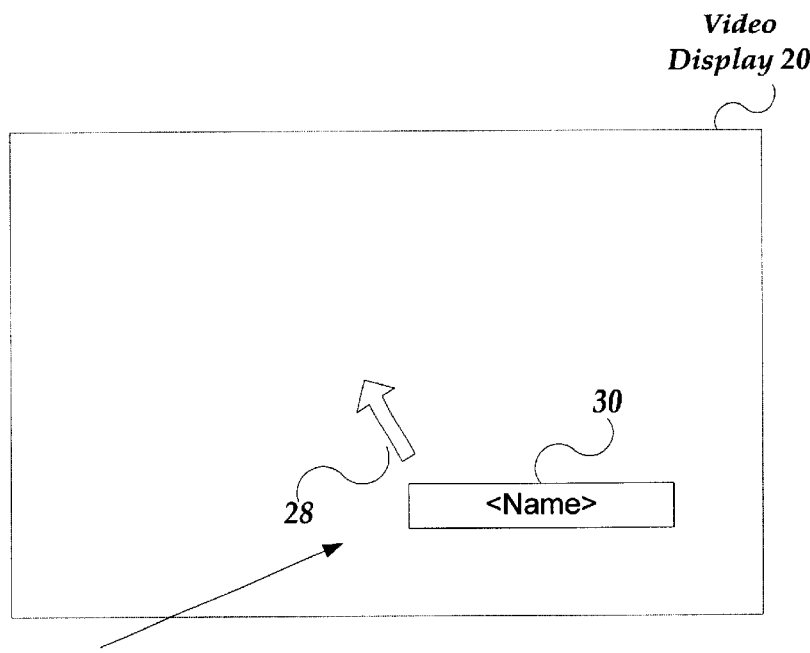
FIGS. 2A, 2B and 2C each contain a diagram showing an example of a name information pointer generated in accordance with the present invention.
Figure 2B:
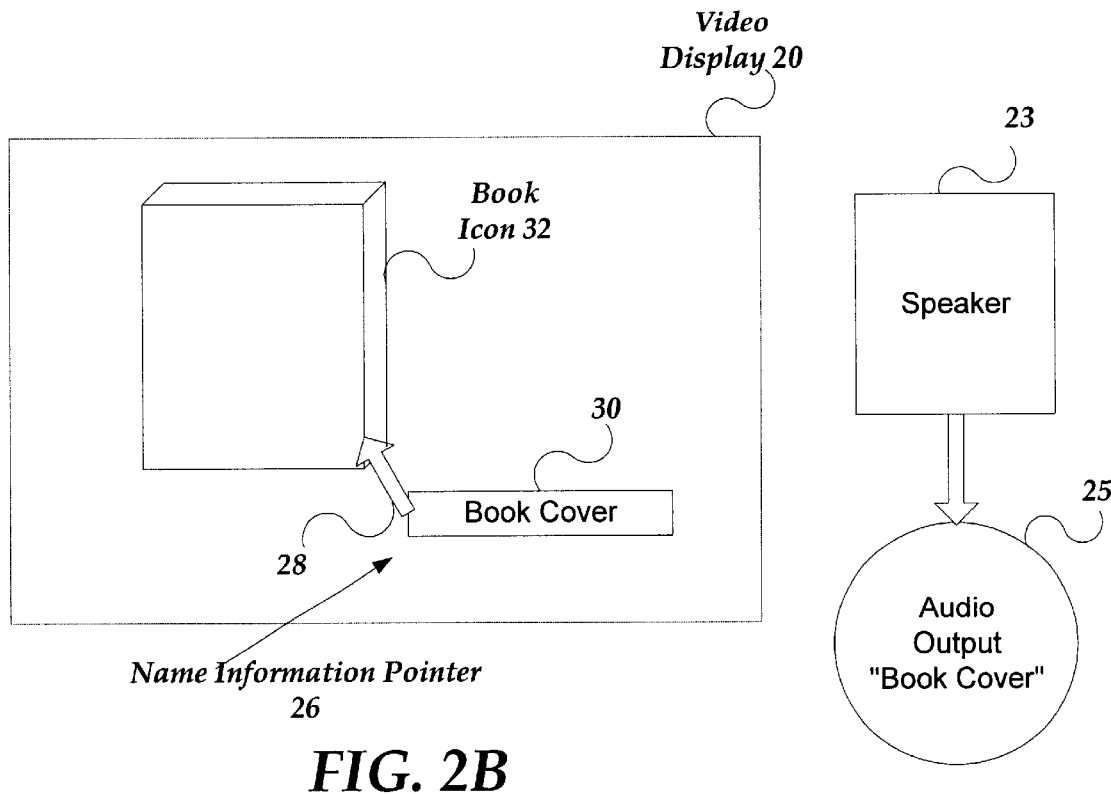
Figure 2C:
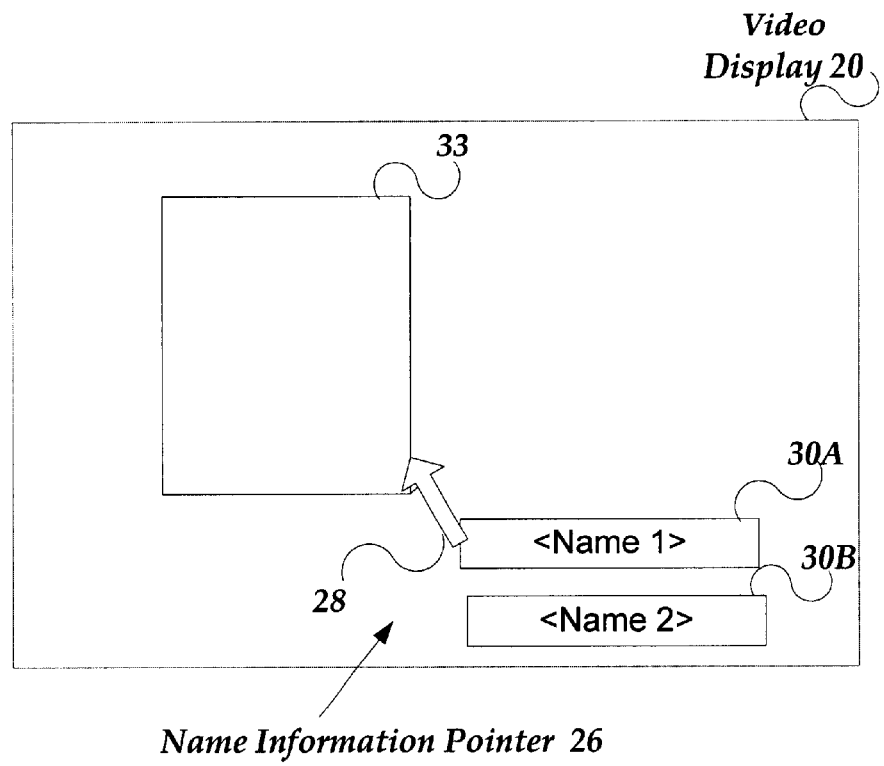
Figure 2C:
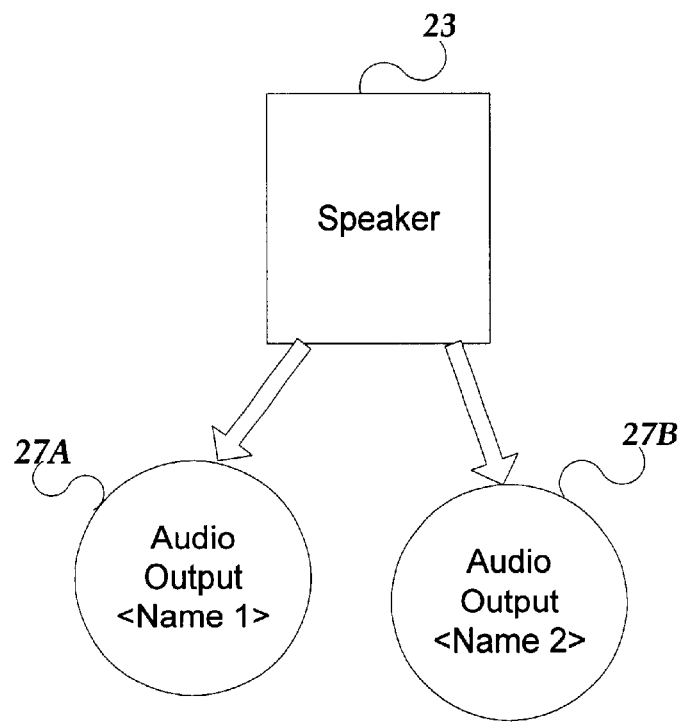
Figure 2D:
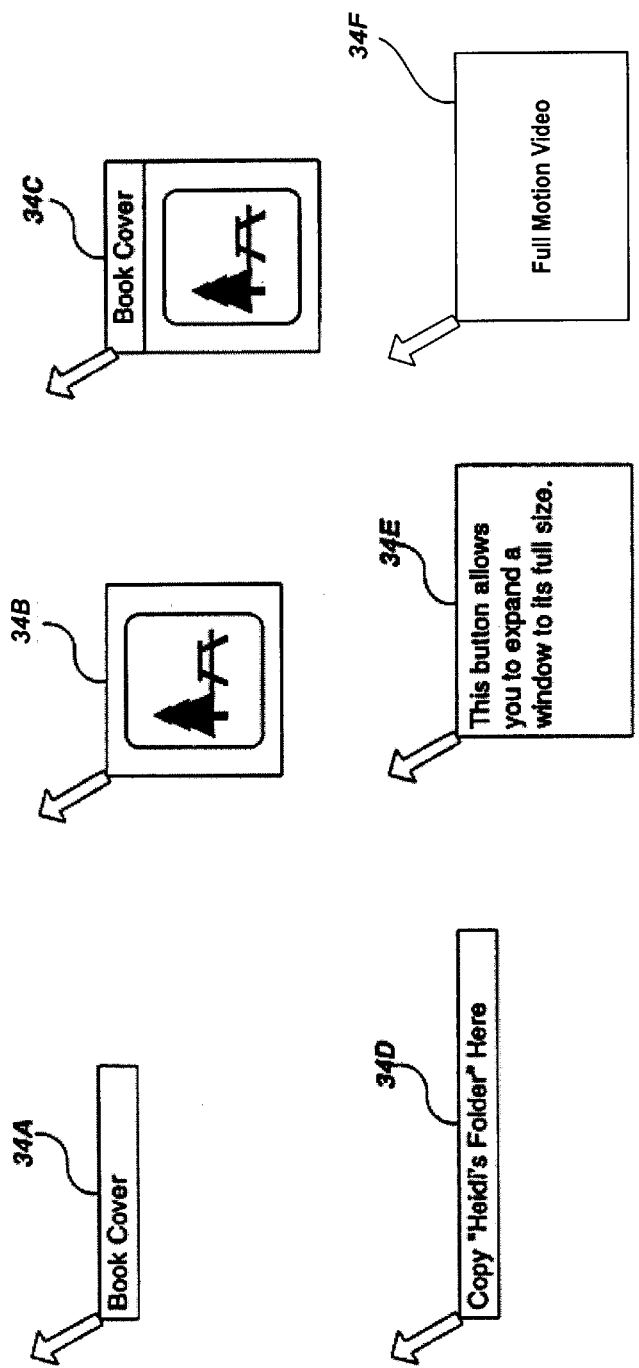
FIG. 2D illustrates several visual information pointers formed in accordance with the present invention.
Figure 2I:
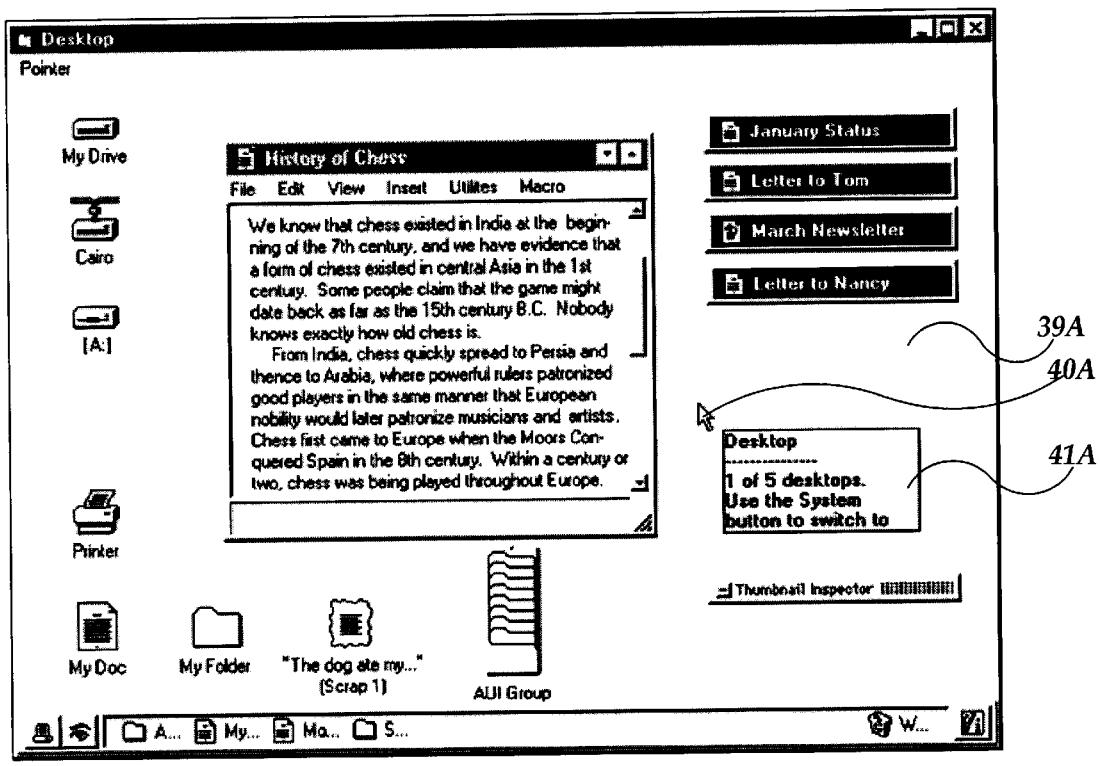
Figure 2M:
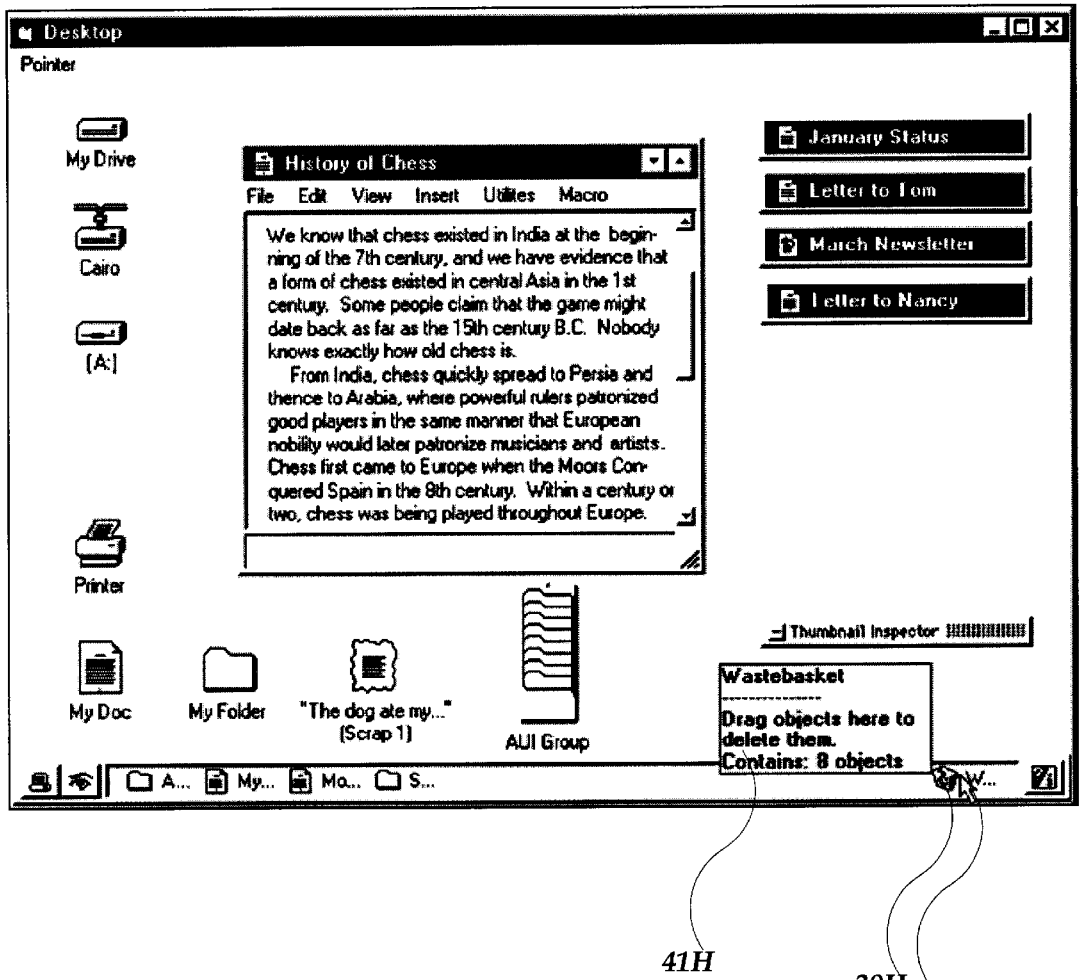
Figure 2N:
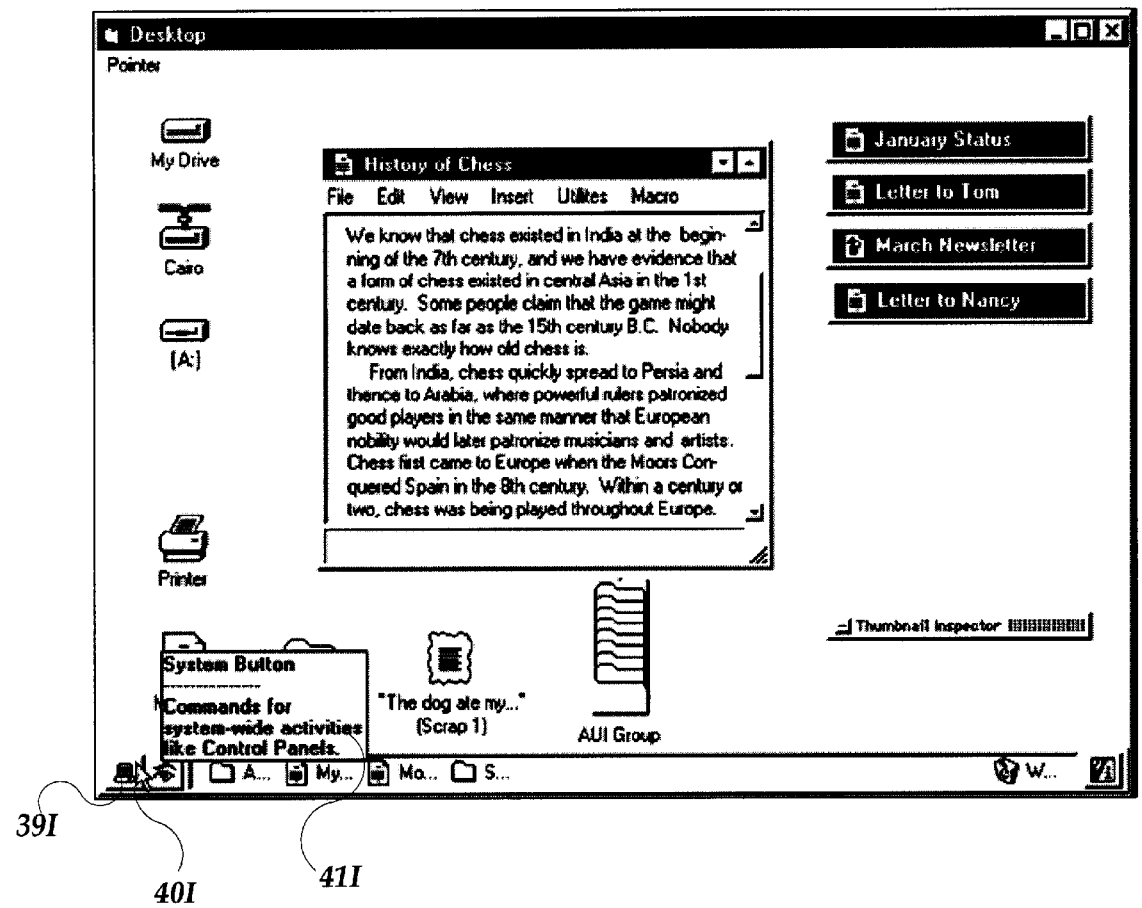
Figure 2S:
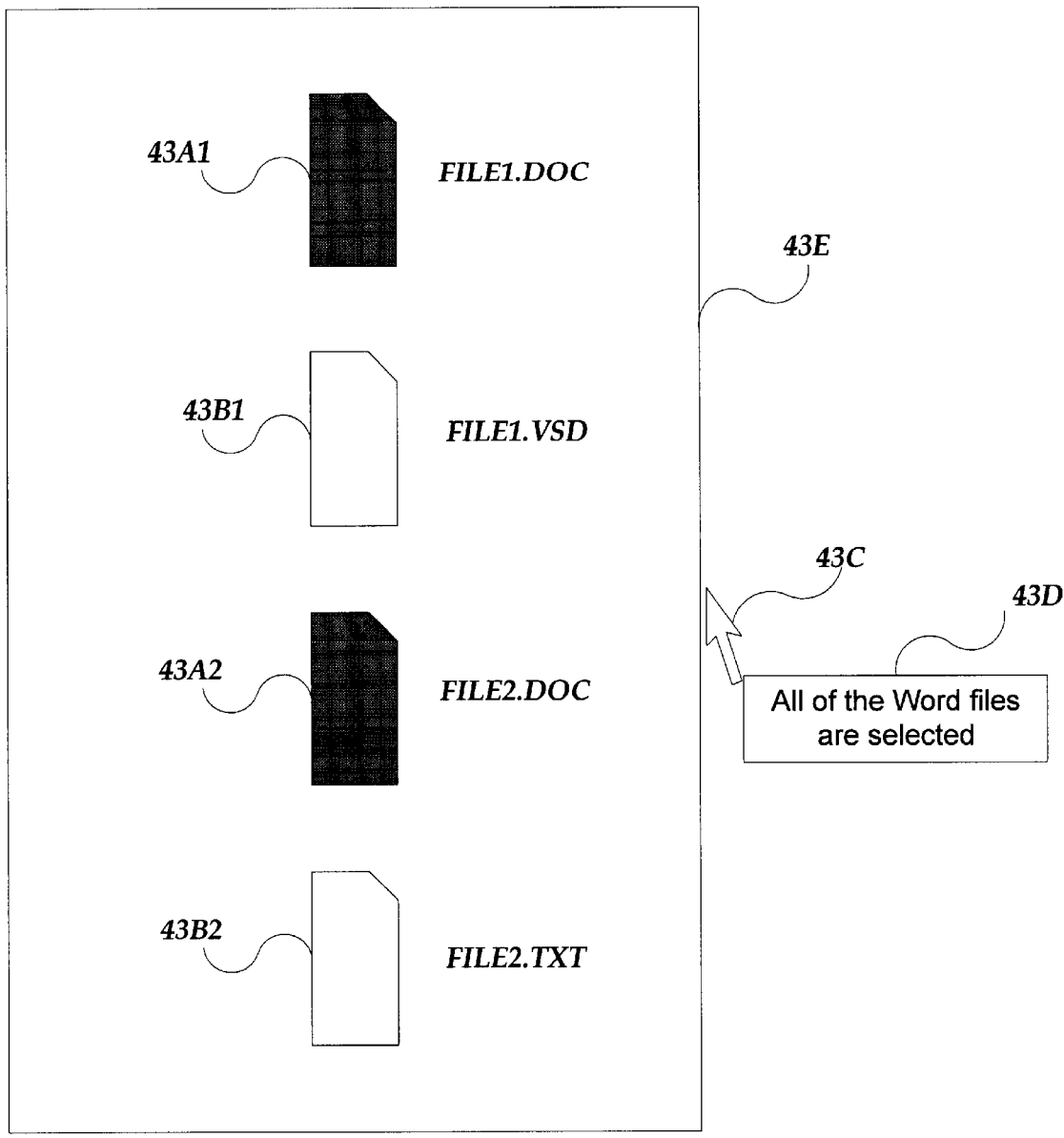
FIG. 2S illustrates an information pointer formed in accordance with the present invention which provides information about a group of related objects.
Figure 2T:
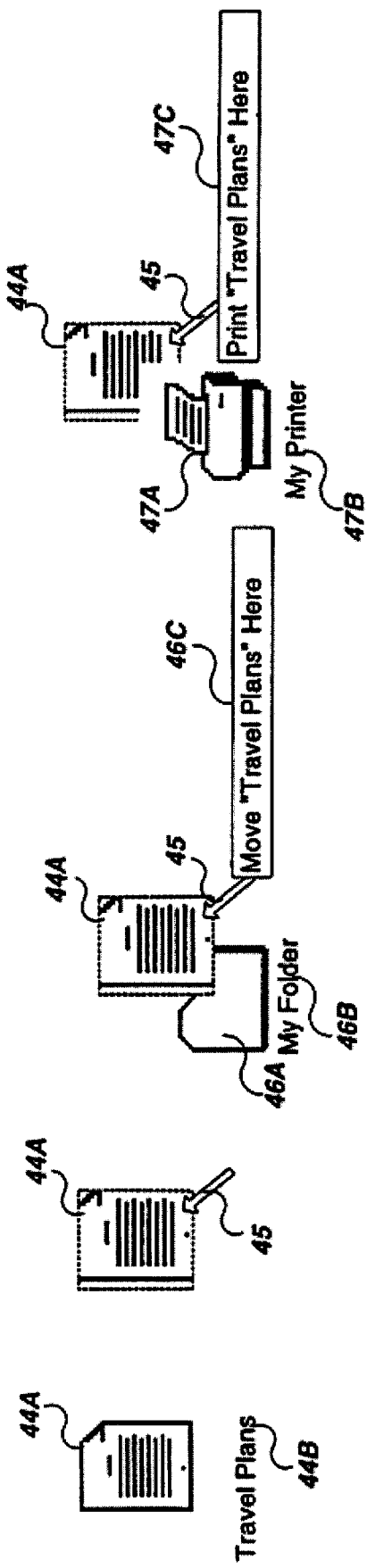
FIG. 2T illustrates the use of an information pointer formed in accordance with the present invention that clarifies the default option of a drag and drop transfer.
Figure 3:
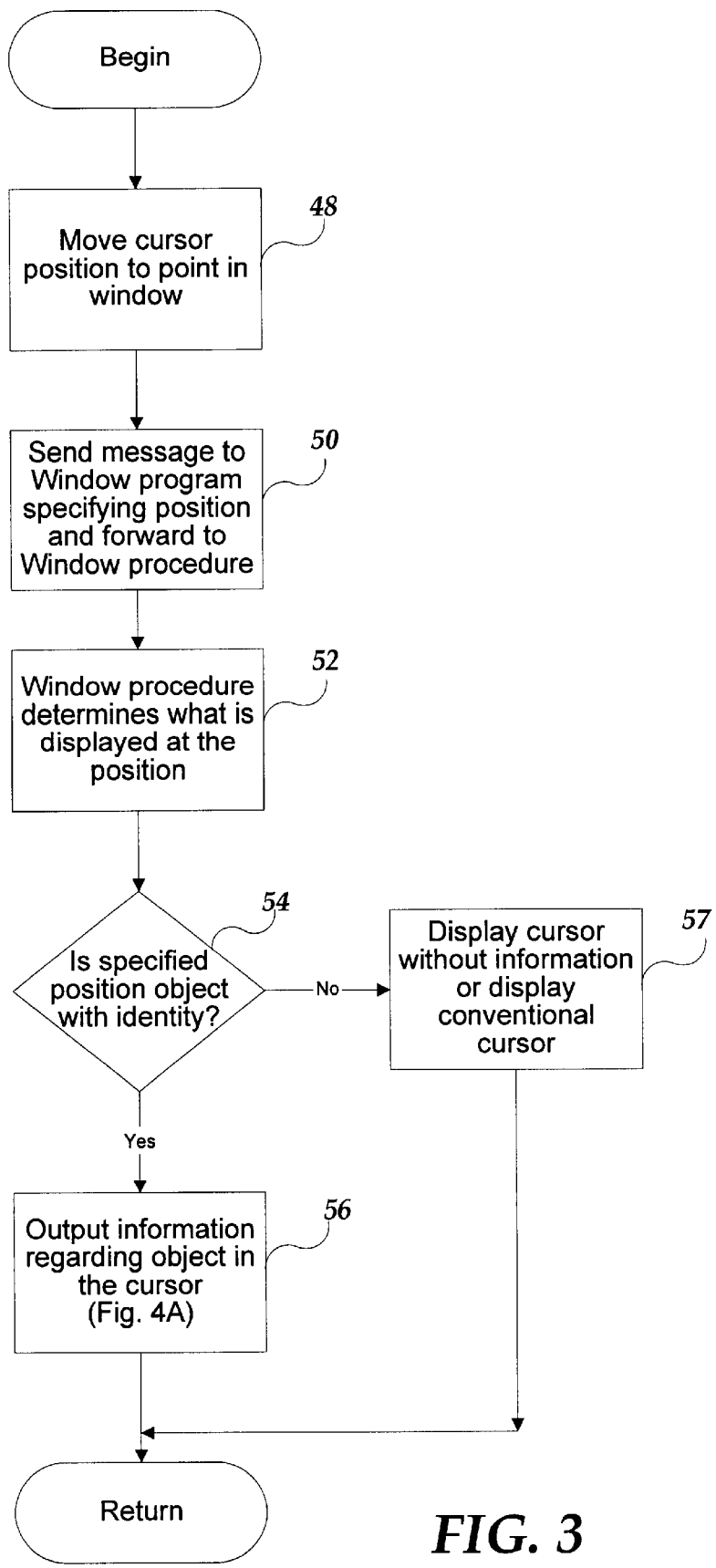

FIGS. 2A–2T, described in detail below, show several examples of information pointers. The examples show how information pointers provide information about various types of objects, as well as the use of a variety of formats for outputting the information. In an actual embodiment of the present invention, the user can choose to display an information pointer from among the following formats: name; information; preview; or any combination thereof. The user can also select none (i.e., no information pointer). If the user selects the name option, when the tip of a cursor arrow obscures a portion of an object, the name of the object will be displayed in an information box located at the tail of the cursor arrow and/or the name will be output over the audio output device. Examples of name information pointers are shown in detail in FIGS. 2A–2C. Additional examples of name information pointers are shown in FIGS. 2P1–2P3. If the information option is selected, when a portion of an object is obscured by the tip of a cursor arrow, any additional information as specified by the operating system and/or application program(s) will be output. Examples of information pointers using both the name and the information option are shown in FIGS. 2I–2N. If the preview option is selected, when the tip of a cursor arrow obscures a portion of the object, a pictorial representation of the contents of the object will be output. Examples of preview information pointers are shown in FIGS. 2Q1–2Q5. If the user selects none, normally, no information will be output when the tip of a cursor obscures a portion of an object. An exception occurs when information is deemed critical in nature. In this case information is output even though the user has selected none. Examples of critical information are the full name of an object if the name is not displayed or is truncated (e.g., see FIG. 2P3) and the name of an individual object contained within a group of objects, such as a file within a file rack (e.g., see FIG. 2P2).

FIG. 2A shows an example of one type of information pointer, a name information pointer 26, displayed on the video display 20. Name information pointer 26 includes a pointing portion 28 (i.e., a conventional pointing cursor) and an information box 30. The information box 30 displays the name of the object to which the pointing portion 28 points.

FIG. 2B shows an example of how the name information pointer 26 is used. Suppose that a book icon 32, representing a book of text stored in the system 10 (FIG. 1), is displayed on the video display 20. When the pointing portion 28 of the name information pointer 26 points to the book icon 32, the name information box 30 of the name information pointer displays the phrase "Book Cover." More generally, the information box 30 displays the name of the item to which the pointing portion 28 points. In addition, audio information may be stored for objects such that when the pointing portion 28 of the name information pointer 26 points to an object, audio output specifying the name of the object is generated. Hence, audio output 25 "Book Cover" is generated by speaker 23 in the example of FIG. 2B. The audio output 25 may be generated in conjunction with the visual output of the information box 30 or independently without the information box 30. The user interface may be programmed such that, when the pointing portion 28 points to nothing of significance, the information box 30 remains blank and no audio output is generated. Alternatively, the user interface may be programmed so that the information box 30 disappears in such an instance.

In some circumstances, the name information pointer 26 may include two information boxes 30A and 30B, such as shown FIG. 2C. For instance, in an operating system that supports drag and drop operations, two names may be displayed in the name information pointer 26 during a drag and drop operation. In particular, the name of the source object and the name of the target object are shown in information boxes 30A and 30B, respectively. The target object name is not shown until the pointing portion 28 of the name information pointer 26 is moved to point to the target object. A source object icon 33 for the source object is dragged along with the cursor during the drag portion of the operation. Alternatively, the information in information boxes 30A and 30B can be combined into a single information box.

As when a single information box is displayed, audio information may be output in conjunction with the information displayed in the information boxes 30A and 30B. In fact, the audio information may be output instead of the information displayed in the name boxes 30A and 30B. In the example shown in FIG. 2C, audio output 27A specifying the name of the source object is output by speaker 23 when the pointing portion 28 is first positioned over the source object icon 33. Later, during the drag operation when the pointing portion 28 is positioned over a target object icon 27B, audio output specifying the name of the target object is output by speaker 23. In another embodiment of the present invention, the impending action between the source and target object is output, for example, "source moving to target."

Information pointers can be used to provide information about any object on the video display 20. FIGS. 2D–2T further illustrate the expansive uses of information pointers. The examples in FIGS. 2D–2T illustrate the use of visual information pointers. However, it will be appreciated that audio information pointers could have been used instead of or in addition to visual information pointers in the following examples.

FIG. 2D shows several examples of visual information pointers that may or may not have audio equivalents. A visual information pointer may contain only textual information 34A (such as the identity of a location or object, i.e., "Book Cover"), only pictorial information 34B (such as a scene), or a combination of textual and pictorial information 34C. Visual (and audio) information pointers can contain information about a user's interaction with an object 34D, or information about the object itself 34E. The pictorial information contained in the visual information pointer may also include full-motion video 34F.

As shown in all of the examples in FIG. 2D, the information box of the information pointer is positioned relative to the cursor, not relative to the object to which the cursor is pointing. In each of the examples in FIG. 2D, the cursor is an arrow that points northwest and the information box of the information pointer is located at the tail of the cursor arrow, i.e., at the southeast end of the cursor arrow. The information box of the information pointer will maintain the same relative location with respect to the cursor arrow unless a display boundary is encountered, which would cause a portion of the information pointer to become obscured. If this occurs, the information box of the information pointer is anchored at the encountered edge of the display. In one embodiment of the present invention, if audio pointers are employed, audio is used to inform the user that the cursor arrow has encountered an edge of the video display 20.

FIGS. 2E–2H show several examples of how information pointers are used to supply a user with missing information. In each of these figures, the information display format has been selected. FIG. 2E includes a folder 35A and the title "AUI Group" 35B located below the folder. The tip of a cursor arrow 35C is located over the folder 35A. However, no information box is shown. No information box is shown because the "AUI Group" folder 35A does not have any additional information, such as comments, associated with it. Therefore, FIG. 2E does not illustrate an information pointer containing a conventional cursor arrow and an information box, but instead only a conventional cursor arrow.

In contrast, FIG. 2F includes a folder 36A and the title "Public Relations" 36B located below the folder. FIG. 2F also includes an information pointer formed by a cursor arrow 36C and an information box 36D. FIG. 2F includes an information pointer because the "Public Relations" folder 36A has comments associated with it. When the tip of the cursor arrow 36C moves over a portion of the "Public Relations" folder 36A, the comments that are associated with that folder are displayed in the information box 36D, which is located at the tail of the cursor arrow.

When several files are associated together in a group such that the file names are not displayed or are obscured, as shown in FIG. 2G, as the tip of the cursor arrow moves over an individual folder, the name of that folder, and/or additional information about the folder, as specified by the application, is displayed. More specifically, FIG. 2G includes a file rack 37A containing a plurality of files 37B and the title "AUI Group" 37C located below the file rack. As the tip of a cursor arrow 37D moves over the file folders 37B, an information box 37E that contains folder specific information is displayed.

FIG. 2H includes two images 38A1 and 38A2 of a floor plan. As the tip of a cursor arrow 38B is moved from a position over an area of the floor plan that is not associated with an information pointer, image 38A1, to an area of the floor plan associated with an information pointer, image 38A2, an information box 38C appears that contains information, e.g., "David's Office," regarding the area pointed to by the cursor arrow 38B.

FIGS. 2I–2N are examples of displaying information pointers with both the name and information option selected. In each of these figures, the name of the object pointed to is followed by any additional information provided by the operating system and/or application program(s).

Information pointers can be used to supply information about any object on the video display 20. As shown in FIG. 2I, an information pointer can even apply to a desktop 39A. When the tip of a cursor arrow 40A obscures a portion of an object located on the desktop 39A, the information pointer outputs information about the object at which the cursor is pointing. Conversely, if the tip of the cursor arrow 40A is on the desktop 39A, but is not pointing at any object on the desktop, the information box 41A of the information pointer will contain information about the desktop itself.

As noted above, information pointers can also be used to provide information about any object located on a desktop. FIGS. 2J1 and 2J2 illustrate examples of using information pointers to provide details about devices on the system 10. In FIG. 2J1, when a cursor arrow 40B points to an object representing a disk drive, "A:" 39B, the information box 41B part of an information pointer provides information about the disk drive, "A:." The information in the information box 41B in FIG. 2J1 includes the "owner" of the disk drive, the storage capacity of the disk drive, and the storage capacity currently available on the disk drive. FIG. 2J2 illustrates another example of using an information pointer to provide details about a device on the system 10. The device in FIG. 2J2 represented by an object 39C is a printer. When the tip of a cursor arrow 40C obscures a portion of the object 39C representing the printer, the information contained in the information box 41 C part of the information pointer includes a description of the printer and the number of files in the print queue. Both of the foregoing examples illustrate the use of dynamic information in information pointers. When the tip of a cursor arrow obscures a portion of a device object, the most current information about the device is retrieved at that time.

FIGS. 2K1 and 2K2 illustrate examples of the use of information pointers to describe documents. In FIG. 2K1, when the tip of a cursor arrow 40D obscures (i.e., overlies) a portion of an object representing a document 39D, the information box 41D of an information pointer displays information about the document. The information displayed includes the author of the document, the type of document and the date of the document. The contents of the information displayed in the information box of the information pointer is specified by the operating system and/or one or more application programs. FIG. 2K2 illustrates another example of displaying information in an information box 41 E about a document when the tip of a cursor arrow 40E obscures a portion of an object representing a document 39E. The information displayed in the information box 41E in FIG. 2K2 includes the type of data in the document, the size of the document and the source of the document. Even though the objects represented in FIGS. 2K1 and 2K2 are both documents, the information that the application programs have decided to display is completely different. FIG. 4F, which is described later, shows the types of information that can be displayed in a document object information pointer. FIGS. 2K1 and 2K2 not only exemplify the use of dynamic data in information pointers, but also illustrate the flexibility of information pointers.

FIGS. 2L1 and 2L2 illustrate the use of the name and information display format of information pointers for a group of items. In FIG. 2L1 when the tip of a cursor arrow 40F obscures a portion of a container (i.e., a file rack) 39F, an information box 41F located at the tail of the cursor arrow displays information about the container (i.e., the file rack). In contrast, in FIG. 2L2, when a cursor 40G obscures an individual object (i.e., a folder) 42G within a container (i.e., a file rack) 39G, information about the individual object pointed to by the cursor is displayed in an information box 41G. The information shown in the information box 41G in FIG. 2L2 includes the type of object (i.e., folder), the contents of the folder and the space occupied by the contents of the folder. FIG. 2L2 is another example of the use of dynamic information in an information pointer.

The preceding several examples (FIGS. 2I–2L2) illustrate information pointers used in connection with a desktop and objects located on the desktop. Information pointers are not limited to providing information about a desktop or items located on the desktop. Information pointers can be used to provide information about any object appearing on the video display 20. Besides the desktop, this includes the taskbar, as well as any objects appearing in an application program. FIG. 2M illustrates the use of information pointers with a taskbar that contains a plurality of objects in the form of icons. When the tip of a cursor arrow 40H obscures (i.e., overlies) a portion of an object, in this case an icon, representing a wastebasket, or a portion of an associated object name 39H, an information box 41H displays information about the object at which the cursor is pointing. In the example shown in FIG. 2M, the information displayed along with the name of the icon, i.e., "Wastebasket," includes a description of the use of the wastebasket and the number of items currently in the wastebasket. This example shows how multiple types of information (e.g., summary help information about the object and current contents of the object) can be included in an information box, as well as the dynamic nature of such information. This example also shows the usefulness of displaying a full name, and thus, how errors associated with truncated names, which are often employed on the taskbar can be avoided. In an actual embodiment of the present invention, even if the chosen display format did not include name (e.g., the display format includes information only), the truncated names are nevertheless displayed.

FIG. 2N illustrates another example of how information pointers can be used to provide information about an object 39I located on the taskbar. The object 39I in FIG. 2N is a toolbar button. Although the toolbar button in this example is located on the taskbar, it could have been located anywhere. For example, toolbars are contained in a multitude of application programs, such as, "MS WORD." Toolbars are extremely useful in that they do not take up very much room on the video display 20. Unfortunately, many users, especially new users may not know what function will be performed if the toolbar button is depressed. It can be dangerous to actuate a toolbar or other "soft" button without knowing its function. Alternatively, it can be time consuming to look up the function of each button located on a display. Information pointers solve the problems of lack of knowledge and lack of time associated with an unfamiliar toolbar button by displaying information in an information box 41I about the button when the tip of a cursor arrow 40I obscures a portion of the toolbar button 39I. The information can be brief, as in the example depicted in FIG. 2N or it can be very comprehensive as in the Quick Info Window example shown in FIG. 5 and described below.

While the examples depicted above in FIGS. 2I–2N illustrate information pointers having a name and information format, other formats can be used. One alternative format is a name only format as illustrated in the examples shown in FIGS. 2P1–2P3. In FIG. 2P1 when the tip of a cursor arrow 40J obscures an object, such as a file rack 39J, the name of the object (i.e., the file rack) is displayed in an information box 41J. In an actual embodiment of the present invention, if the display format is none, the name of the object (e.g., the name of the file rack) is displayed when the cursor arrow points to the object (e.g., file rack) regardless of any name display associated with the object. Alternatively, if the display format is none, the name of the object may not be displayed if the name 42J of the object is displayed near the object (i.e., the file rack 39J).

In FIG. 2P2, when the tip of a cursor arrow 40K obscures an individual object, such as a file 42K, located within an object container, such as a file rack 39K, the name of the individual object, in this example, the name of the file, is output in an information box 41K. Preferably, the name is displayed even if a user selects none as the information display format because without the display of the name, a user would have to know the order in which the objects are displayed within a group, or more likely, perform the appropriate action, such as opening or executing individual objects until a desired object is located when a user is searching for a specific object. Because this is a burdensome user task, as noted above, preferably if the chosen information pointers display format is none, the user's decision not to display information pointers is overridden. In this instance the program decides that the information is of such critical importance that the user's setting should be overridden.

In FIG. 2P3, when the tip of a cursor arrow 40L obscures a portion of a taskbar object, in this case a taskbar object representing a wastebasket 39L, the name of the object, i.e., "Wastebasket" is displayed in the information box 41L of an information pointer. Preferably, the name is displayed even if the user had selected none as the information to be displayed in the information box. The reason that the name is displayed even though the user has chosen not to display information is that the name is truncated in the illustrated example. Had the name not been truncated, the selection of none as the display format would not have been overridden.

In addition to the display formats previously discussed (i.e., information, name or none), a user can select a preview format. When the preview format of information pointers is chosen a graphical representation of the contents of the object at which the cursor is pointing is displayed. Examples of preview information pointers are shown in FIGS. 2Q1–Q5.

As shown in FIG. 2Q1, when the tip of a cursor arrow 40M is on a desktop 39M, and not partially obscuring any object located on the desktop, and the chosen information pointer format is preview, a preview of the desktop is displayed in an information box 41M located at the tail of the cursor.

An example of a type of preview information pointer that is displayed when the selected object is a device is illustrated in FIG. 2Q2. As shown in FIG. 2Q2, when the tip of a cursor arrow 40N obscures a portion of an object representing a device 39N, a pictorial representation of the contents of the device in the hierarchical format in which the objects are stored on the device is displayed in an information box 41N. In the illustrated example, the device is a disk drive and the display is a hierarchical tree showing the contents of the disk drive.

FIG. 2Q3 shows an example of the type of preview information displayed in an information box 41P of an information pointer when the tip of a cursor arrow 40P obscures a portion of an object representing a document 39P. The preview information displayed in the information box 41P is the introductory portion of the document in a size that is larger than the size of the object that represents the document 39P, but not in full screen size. The enlarged size is preferably readable, but not as easily readable as a full screen version of the document represented by the object 39P.

FIGS. 2Q4 and 2Q5 are examples of a preview information pointer intended to be associated with container objects. In FIG. 2Q4, the preview information shown in an information box 41Q of an information pointer represents the contents of an "AUI Group" represented by a file rack 39Q. A pictorial representation of the contents of the files contained in the file rack 39Q is shown in the information box 41Q which is located at the tail end of the cursor arrow 40Q whose tip obscures a portion of the container (i.e., file rack). While not shown, if desired each individual file shown in the information box could include a legend identifying the file.

FIG. 2Q5 shows an example of a preview information pointer for an individual object located within a container of objects, such as a file located in a file rack. When the tip of a cursor arrow 40R obscures a portion of an individual object, in this case a file 42R located within a container object 39R, in this case a file rack, an information box 41R of an information pointer located at the tail of the cursor arrow displays a graphical representation of the contents of the object at which the cursor is pointing. In the example shown in FIG. 2Q5, the information box 41R contains a graphical depiction of the folders and documents stored in the file folder pointed to by the cursor arrow 40R.

Being graphical in nature, the preview format may not appear to lend itself to embodiments of the invention that include an audio output device. This is incorrect since applications employing the invention define the contents of an information pointer, the applications can define the contents of an audio information pointer having any format, including the preview format. The preview format of an audio information pointer may be set at none (i.e., no audio output if format is preview). Alternatively, the audio information pointer preview format may be set to name, information, or name and information. Still further, the audio information pointer preview format may be set to emit a unique set of information. In other words, the audio information pointer preview format may contain more or less detail than the information option described above. For example, the visual file folder preview format in FIG. 2Q5 includes several folders and several files. The audio equivalent of the visual preview format could give details about each of the objects, such as the name, size and type of each document. Alternatively, volume and/or tone could be used to describe the size or number of objects. For example, varying volume and/or tone can be used to indicate varying volumes of data. As will be appreciated from the foregoing description an audio information pointer can include any audible sound, such as the sound of noises heard at a party or the sound of a vehicle.

Besides being used in an operating system to provide information about items on a desktop or included in a taskbar as depicted in the above examples, information pointers can be used in application programs. An obvious example of using information pointers in an application program is to use information pointers to provide information about toolbar buttons generated by the application program. Another use for information pointers in application programs is to provide information about dialog box controls. FIGS. 2R1–2R4 illustrate several examples of the use of information pointers in connection with dialog box controls. FIG. 2R1 illustrates an example of how an information pointer can be used to display all of the information associated with a piece of information that is truncated on a display. When the tip of a cursor arrow 39B1 obscures a portion of a dialog box control containing the truncated information 39A1, the information box 39C1 of an information pointer that contains the full text of the truncated item pointed to by the cursor arrow is displayed. While the dialog box control shown in FIG. 2R1 is an item in a list box, it is to be understood that information pointers can show the full text of any truncated item. Other types of dialog box controls that may include truncated text are title bars, edit boxes and combo boxes. The use of information pointers to display the entire contents of truncated text does not just apply to dialog box controls. An example of truncated text for a taskbar item is shown in FIG. 2P3, described above.

Another use for dialog box control information is to provide information about relative location. See FIG. 2R2 which shows a slider 39A2. When the tip of a cursor arrow 39B2 obscures a portion of the slider 39A2, an information box 39C2, which contains the value represented by the position pointed at by the cursor appears.

FIG. 2R3 shows the application of a dialog box control information pointer to a scroll bar 39A3. When a cursor arrow 39B3 points to a portion of the scroll bar 39A3, an information box 39C3 that gives some meaningful information about the extent to which the window is scrolled appears. The information box may read "page 4 of 5" or "row 37 of 80," for example. Another example of the use of information pointers with a scroll bar is where a mouse lingers over the scroll bar itself. In this case, the information box 39C3 may provide meaningful information about what will happen if the user clicks while the cursor is pointing to a particular scroll bar position, for instance, "scroll to page 4 of 5."

FIG. 2R4 illustrates an example of another use of information pointers In FIG. 2R4, an information box is used to display information about valid values for the data represented by a value in an edit box 39A4. When the tip of a cursor arrow 39B4 obscures a portion of the edit box 39A4, the information about valid value of data located in the edit box is displayed in an information box 39C4. For example, as shown, the information could tell a user that a numerical value in the edit box must be an integer lying in some range. In this example, the application program could choose to display valid values any time the cursor obscures a portion of the edit box, or only when the edit box contains invalid data. Information pointers can be used for data validation in other dialog box controls, such as combo boxes.

Information about a collection of objects can be provided with information pointers. As shown in FIG. 2S, if a directory contains several file types and the user selects all of the "MS WORD" documents (43A1 and 43A2), but does not select any of the files that are not "MS WORD" documents (43B1 and 43B2), the information pointer informs the user that "All of the Word files are selected" in an information box 43D displayed at the tail of a cursor arrow 43C pointing to an object representing the directory 43E.

FIG. 2T is a series of images showing the use of information pointers in drag and drop operations. Specifically, FIG. 2T illustrates what occurs when a document 44A denoted "Travel Plans" 44B is dragged and dropped at either a folder icon 46A denoted "My Folder" 46B or a printer icon 47A denoted "My Printer" 47B. Initially, a cursor arrow 45 is positioned atop the document 44A using a suitable cursor control input device, and the drag key actuated. In a conventional manner, the input device, with the drag key actuated, is operated to move the document 44A to a position overlying the folder icon 46A or the printer icon 47A. When overlying the folder icon, an information box 46C containing, for example, the message "Move 'Travel Plans' Here" appears. Release of the drag key results in this message action taking place. When overlying the printer icon 47A, an information box 47C containing, for example, the message "Print 'Travel Plans' Here" appears. Release of the drag key results in this message action taking place.

In summary, in response to the user's interaction with the input device, the cursor is moved over a source object, i.e., the document 44A. Using the input device, the user selects the source object and proceeds to move the source object over a possible target object, i.e., the folder icon 46A or the printer icon 47A. When over a possible target object, an information box that contains information informing the user of the consequence of completing the operation of dropping the selected source object onto the target object to which the cursor is currently pointing appears. Dragging the "Travel Plans" document 44A over a printer icon 47A causes the information box 47C to inform the user that the "Travel Plans" document will be printed if the source object, (i.e., the "Travel Plans" document) is dropped. Dragging the "Travel Plans" document 44A over the folder icon 46A causes the information box 46C to inform the user that the "Travel Plans" document will be moved to the folder, if the source object, (i.e., the "Travel Plans" document) is dropped. Depressing a certain key or a combination of keys on the keyboard can be used to change the default result of a drag and drop action. For example, instead of moving the source object to the folder, the source object might be copied into the folder, or a link might be created. The information box will display the appropriate alternate action, if the keyboard is used to alter the default action of a drag and drop operation.

The implementation of the information pointer with the audio and visual output in the preferred embodiment of the present invention will now be described with reference to the Microsoft WINDOWS, version 3.1, operating system. In particular, the operating system 22 is an embellished version of the Microsoft WINDOWS, version 3.1, operating system that supports the use of information pointers. The present invention is not limited to implementations with this operating system, rather, those skilled in the art will appreciate that the present invention may be implemented with other operating systems such as Windows 95, Windows 98 and Windows NT, as well.

In explaining the implementation of the preferred embodiment of the present invention, it is helpful to consider the type of input device that is used. In the discussion that follows, it is assumed that the mouse 18 (FIG. 1) is used as the input device for manipulating the position of the cursor on the video display 20. It should, nevertheless, be appreciated that the present invention is not limited to the use of a mouse as the input device; rather, other input devices, such as keyboard 16 or a pointing device, may alternatively be used.

The operating system 22 (FIG. 1) logically divides the user interface into a number of windows. In general, each window has a separate window procedure associated with it. The operating system 22 maintains a message queue for each program that generates windows. As a program may generate multiple windows, the message queue may hold messages for multiple windows. When an event occurs, the event is translated into a message that is put into the message queue for the program. The program retrieves and delivers the message to the proper window procedure by executing a block of code known as the "message loop." The window procedure that received the message then processes the message.

When a user positions a cursor with the mouse 18 over a window or clicks the mouse by depressing one of the mouse buttons within the window, the procedure for the window receives a mouse message. The operating system 22 provides a number of predefined mouse messages. The mouse messages specify the status of mouse buttons and the position of the cursor within the window. The position of the cursor within the window is specified in (X,Y) coordinates relative to the upper left-hand cover of the window. The window procedure receives the mouse message and utilizes the information contained in the message to respond to the mouse activities. A new mouse message need not be generated for every single pixel position change of a mouse within a window; rather, a message may be generated each time the mouse moves more than a threshold number of pixels transversed by the mouse.

This message system plays a role in the implementation of information pointers described above. The appearance of the cursors on the video display 20 (FIG. 1) is dictated by bitmaps stored within the operating system 22. The role that the message loop serves in the implementation of the information pointers can be seen in the flow chart of FIG. 3, which illustrates the steps performed by the system 10 (FIG. 1) when the cursor moves into a window that is displayed on the video display 20. Initially, the cursor position is moved by the mouse 18 or other input device to point within the window (step 48 in FIG. 3). A message is generated and sent to the application program that is executing, which, in turn, forwards the message to the window procedure associated with the window (step 50). The message specifies the position of the cursor in the window as described above. The window procedure then determines what is displayed at the cursor position within the window (step 52). For instance, an object may be at the specified position or nothing of particular importance may be at the specified position. A determination is made whether the specified position corresponds to the position of an object with an identity (step 54). In other words, a determination is made whether a named entity is present at the specified cursor position. If a named entity is present at the specified cursor position, the information regarding the object at the specified cursor position is output (step 56). This information may be video information, audio information or both audio and video information. Video information includes textual and/or graphical information. Graphical information includes full motion video, as well as bitmap and image data. If, however, a named entity is not present at the specified cursor position, either a conventional cursor is displayed or the information containing portion of the information pointer is shown in blank (step 57). The choice between these options is controlled by the application program.

Figure 4A:
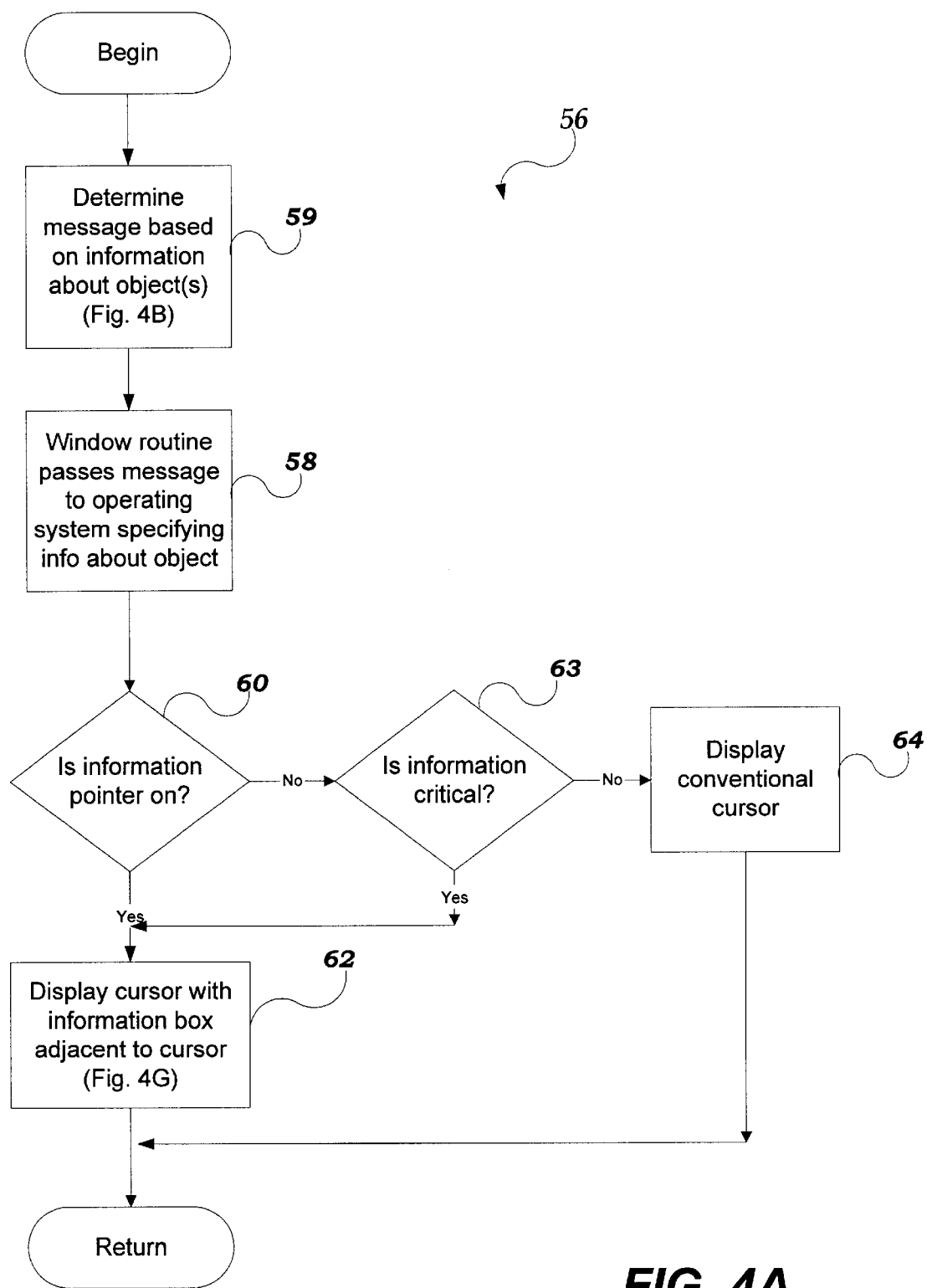
FIG. 4A is a flow chart illustrating in more detail how information about an object is output in an information pointer generated in accordance with the present invention.

FIG. 4A is a flow chart showing in more detail the steps that must be performed in order to realize step 56 of FIG. 3 of outputting information about the object to which the pointing portion points. First, the contents that will appear in the information box must be determined based on the object or objects to which the cursor is pointing (step 59).

Figure 4B:
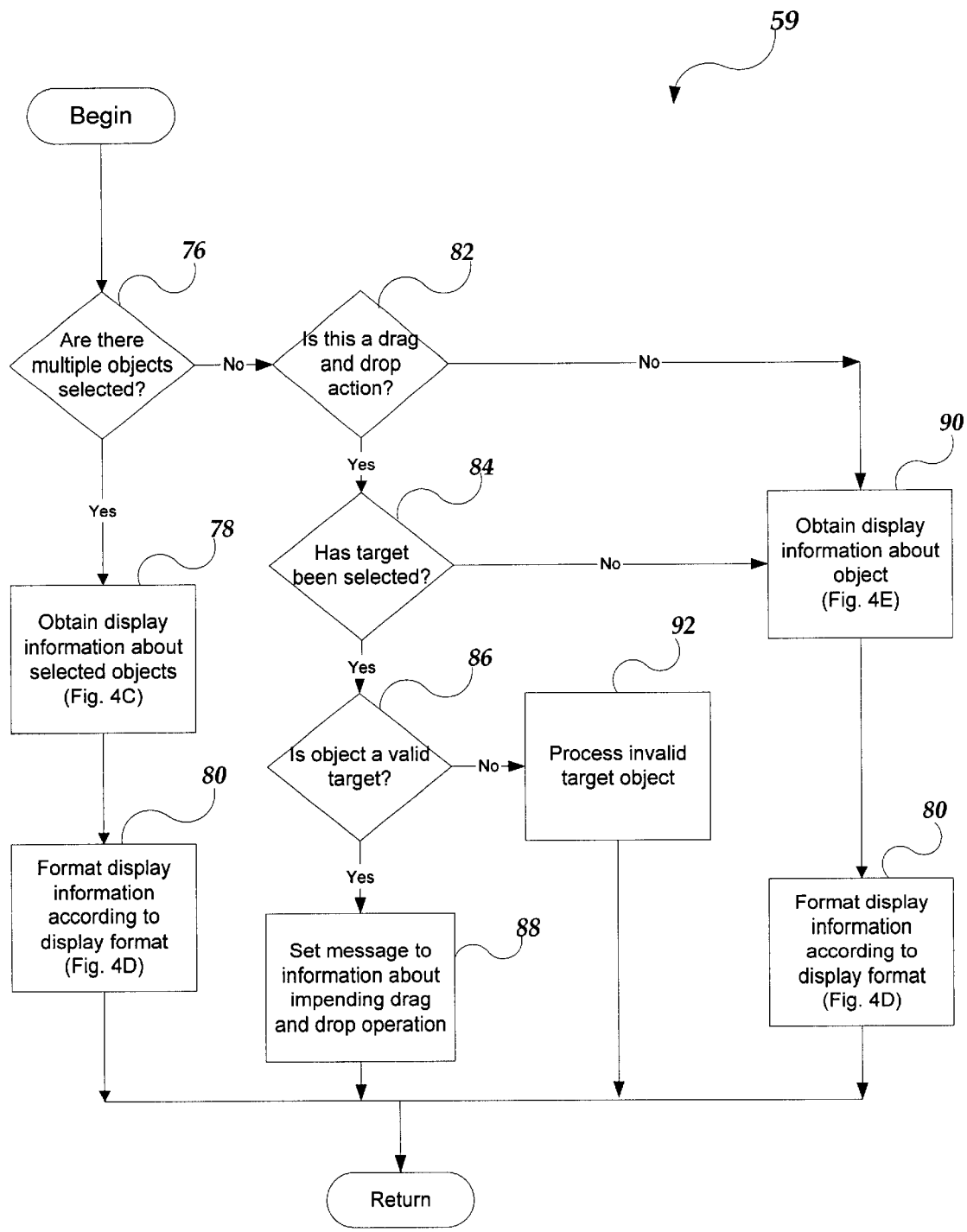
FIG. 4B is a flow chart illustrating in more detail how information about different types of objects are output in an information pointer generated in accordance with the present invention.

FIG. 4B is a flow chart showing in more detail the steps performed in order to realize step 59 of FIG. 4A of determining the message based on information about the object(s). The first step in FIG. 4B is to determine if multiple objects are selected (step 76). If multiple objects are selected, information is obtained about the selected objects (step 78).

Figure 4C:
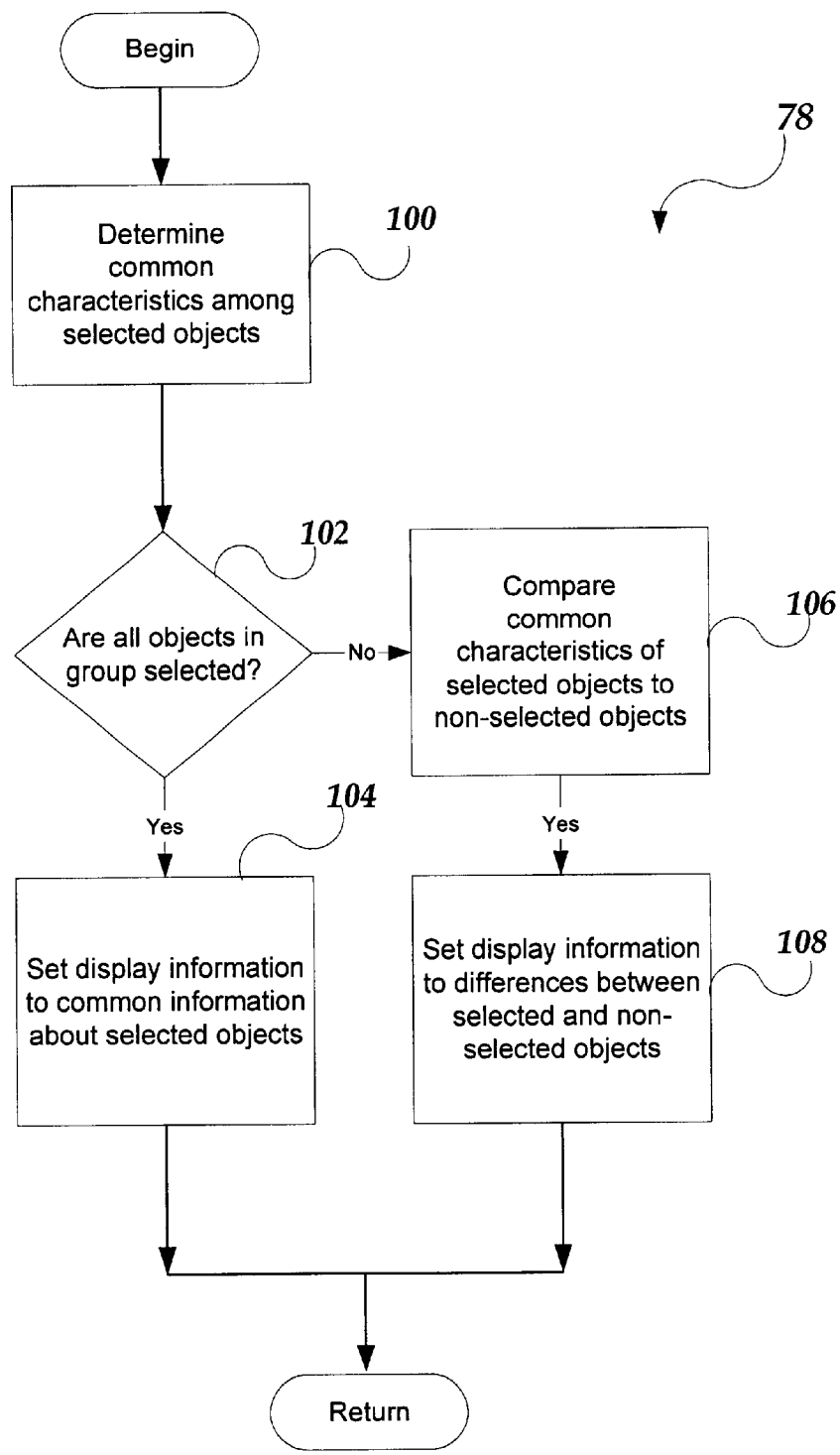
FIG. 4C is a flow chart illustrating in more detail how information is obtained in accordance with the present invention when multiple objects are selected.

FIG. 4C is a flow chart showing in more detail the steps performed in order to realize step 78 of FIG. 4B of obtaining display information about a selection of multiple objects. All of the selected objects are examined for common characteristics (step 100). Next, a test is made to determine if all of the objects in the group or container (e.g., all files in a directory) have been selected (step 102). If all of the files in the group have been selected, the display information is set to reflect the common information about the selected objects (step 104). If, however, all of the items in the group have not been selected (i.e., a subset of 2 or more objects has been selected), the common characteristics of the selected objects are compared with the characteristics of the objects in the group that were not selected (step 106). The display information is then determined, such that the user is informed of the differences between the selected and non-selected objects (step 108). For example, if a directory contains a plurality of different types of files, and the user selects all of the "MS WORD" files in the directory, the information pointer would output a message stating that all of the "MS WORD" files have been selected, as shown in FIG. 2S, described above.

Figure 4D:
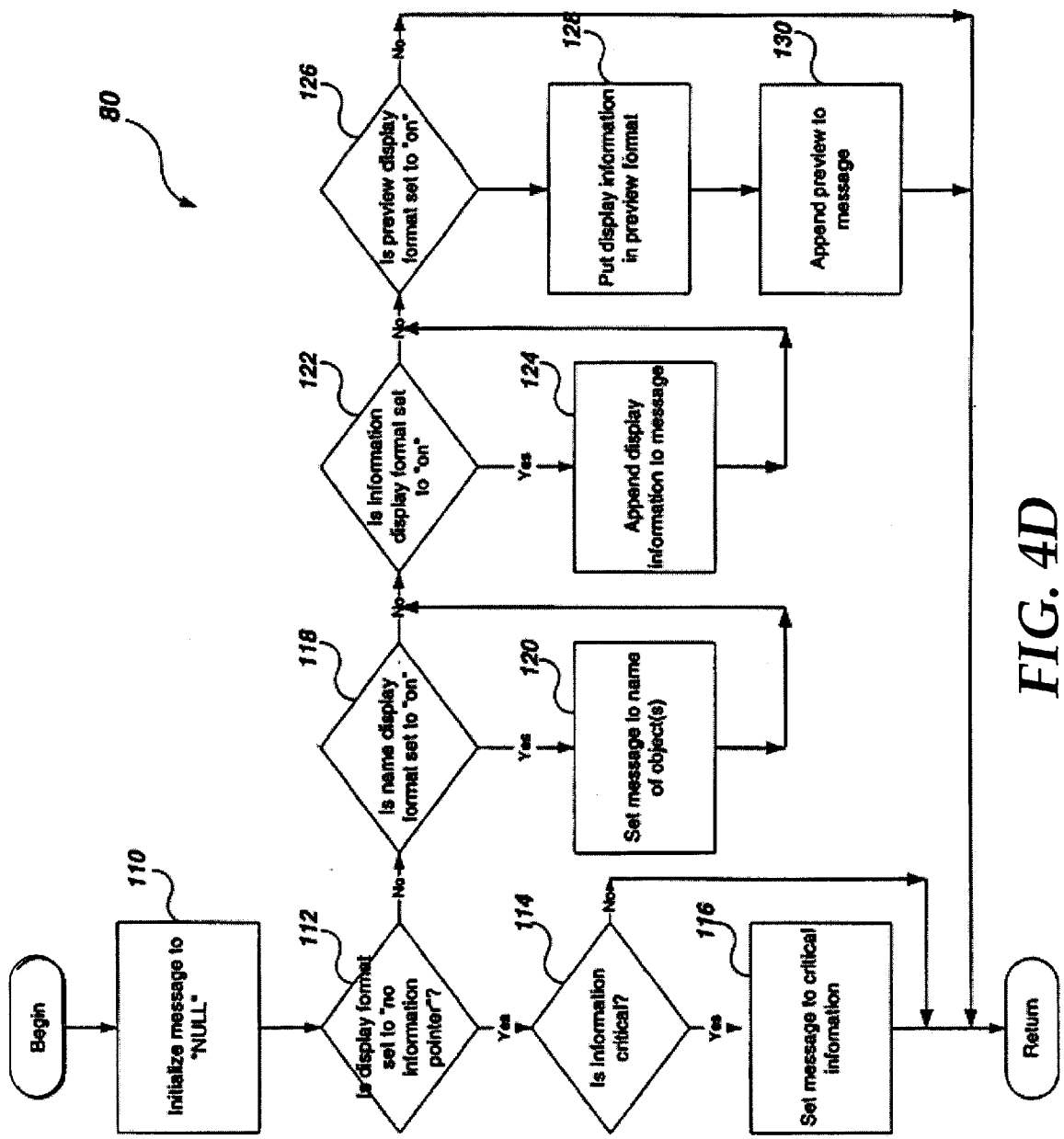
FIG. 4D is a flow chart illustrating in more detail how information is formatted for an information pointer based on the display format of the information pointer formed in accordance with the present invention.

Returning to FIG. 4B, after the display information has been obtained, it must be formatted according to the display format (step 80). In an actual embodiment of the present invention, the user can select the format for the display of the information pointer as: name, information, preview, or any combination thereof. The user may also select to not have information pointers displayed. Examples of information pointers using the various formats are described above with respect to FIGS. 2A–2T. FIG. 4D is a flowchart showing in more detail the steps that must be performed in order to realize step 80 of FIG. 4B of formatting the display information according to the display format. In FIG. 4D, message must first be initialized to "null" (step 110). After the message has been initialized to "null," the display format must be determined. If the display format is set to "no information pointer" (step 112), a test is made to determine if the information is critical (step 114). If the information is critical, the message is set to the critical information (step 116). In an actual embodiment of the present invention, the name is displayed as the critical information as shown in FIGS. 2P1–2P3. If the display format is not set to "no information pointer," a test is made to determine if name display format is set to "on" (step 118). If name display format is set to "on," the message is set to the name of the object(s) (step 120). Regardless of whether or not the name is displayed, a test is made to determine if the information display format is set to "on" (step 122). If the information display format is set to "on," the previously determined display information is appended to the message (step 124). Whether or not information display is set to "on," a test is made to determine if preview display format is set to "on" (step 126). If preview display format is set to "on," the display information must be put into preview format (step 128). After the display information has been put in preview format, the preview is appended to the message (step 130).

Returning to FIG. 4B, if there are not multiple objects selected (no response in step 76), a test is made to determine if the user is in the process of performing a drag and drop operation (step 82). If the user has commenced a drag and drop operation, the current stage of the operation is determined. If the target object has been selected (step 84), a test is made to determine if the selected target object is a valid target for the source object (step 86). If the object is a valid target object, information is output about the impending drag and drop operation (step 88), for example, "Copying source to target." If the target is not valid, processing for an invalid target object is performed (step 92). It will be appreciated that there are a myriad of ways to process an invalid target object. In one actual embodiment of the present invention, no information is displayed in the information box but the cursor changes, for example, to a circle with a slash through the circle. In another embodiment, an error message is displayed in the information box. If the cursor is not obscuring a portion of a possible target object (no response in step 84), information is obtained about the source object (step 90).

Figure 4E:
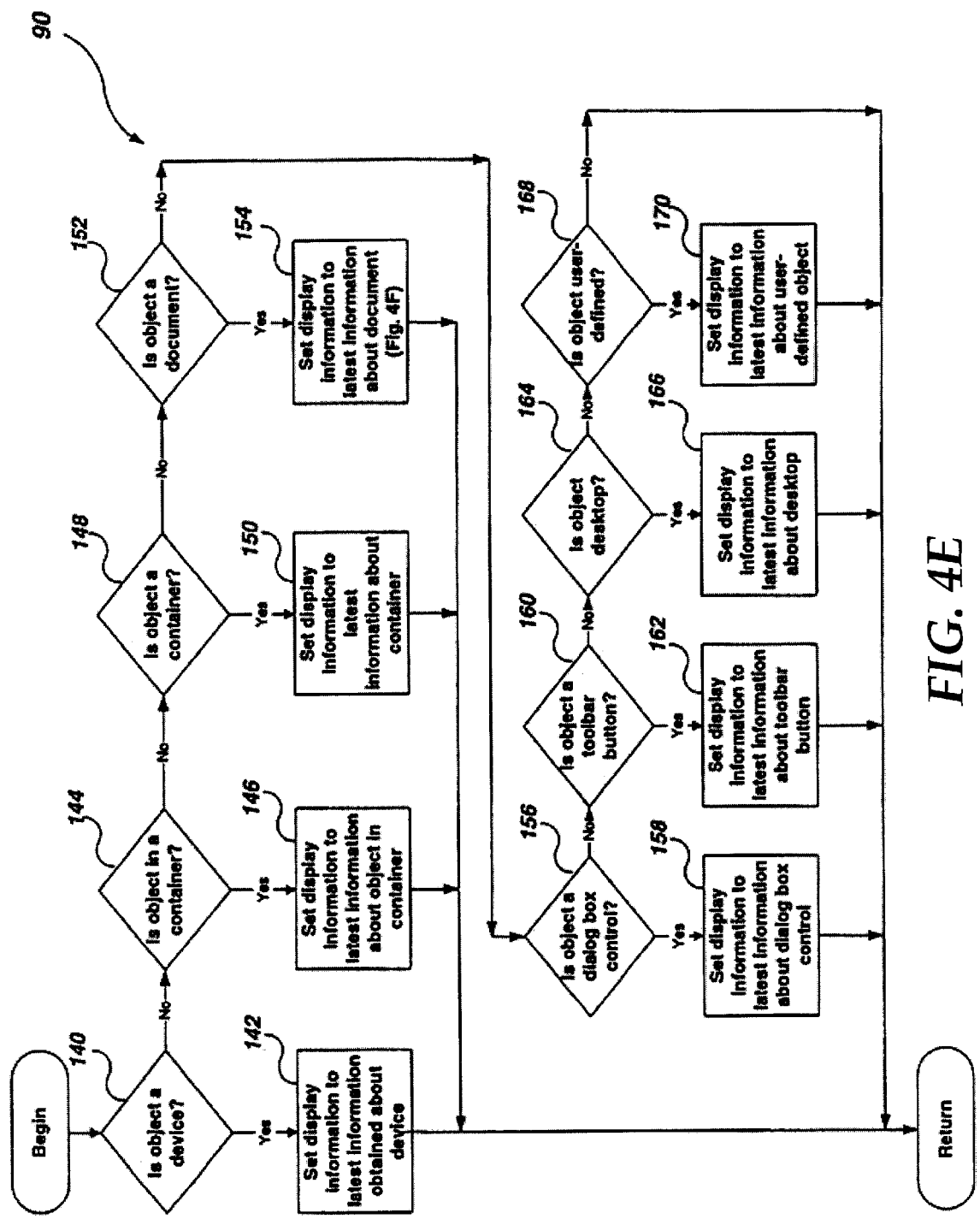
FIG. 4E is a flow chart illustrating in more detail how information is obtained for an individual object in accordance with the present invention.
Figure 4F:
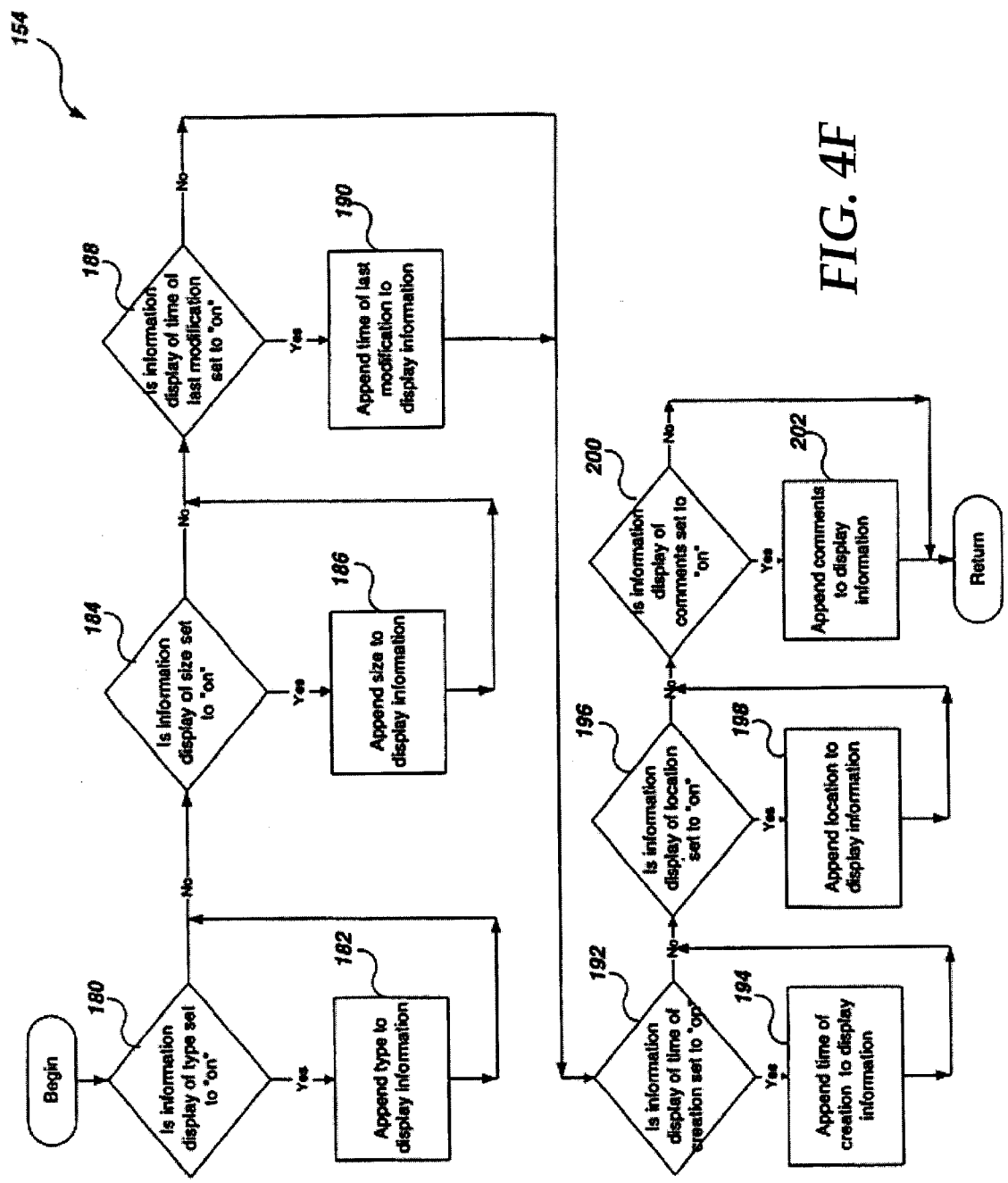
FIG. 4F is a flow chart illustrating in more detail how information is obtained for a document object in accordance with the present invention.

FIG. 4E is a flowchart showing in more detail the steps performed in order to realize step 90 of FIG. 4B of obtaining display information about an object. The display information is determined based on the type of object. First, a test is made to determine whether or not the object is a device (step 140). If the object is a device, the display information is set to the latest information about the selected device (step 142). Examples of the display of information pointers for device objects are shown in FIGS. 2J1 and 2J2, described above. If the object is not a device, a test is made to determine whether or not the object is contained within a container object (step 144). If the object is located in a container object, the display information is set to the latest information about the object in the container (step 146). Examples of information pointers used in connection with container objects are shown in FIGS. 2L2 and 2P2, described above. If the object is not contained within a container, a test is made to determine if the object itself is a container (step 148). If the object is a container, the display information is set to the latest information about the container (step 150). An example of an information pointer used to provide information about a container object is shown in FIG. 2L1, described above. If the object is not a container, a test is made to determine if the object is a document (step 152). If the object is a document, the display information is set to the latest information about the document (step 154). FIGS. 2K1 and 2K2, described above, show examples of information pointers used to provide information about document objects.

FIG. 4F is a flowchart showing in more detail the steps performed in order to realize step 154 of FIG. 4E of setting display information to the latest information about a document. The are many characteristics associated with a document. Any combination of these characteristics may be displayed in an information pointer. First, a test is made to determine if the information display for type of document is set to "on" (step 180). If the information display for type is set to "on," the type is appended to the display information (step 182). Next, a test is made to determine if the information display for size of document is set to "on" (step 184). If the information for size is set to "on," the size of the document is appended to the display information (step 186). Then, a test is made to determine if the information display for time of last modification is set to "on" (step 188). If the information display for time of last modification is set to "on," the time of last modification is appended to the display information (step 190). Thereafter, a test is made to determine if or not the time of creation is set to "on" for the information display (step 192). If the information display for time of creation is set to "on," the time of creation is appended to the display information (step 194). Next, a test is made to determine whether or not the information display for location is set to "on" (step 196). If the information display for location is set to "on," the location (i.e., path) is appended to the display information (step 198). And finally, a test is made to determine if the information display for comments is set to "on" (step 200). If the information display for comments is set to "on," comments are appended to the display information (step 202).

Returning to FIG. 4E, if the object is not a document, a test is made to determine if the object is a dialog box control (step 156). If the object is a dialog box control, the display information is set to the latest information about the dialog box control (step 158). FIGS. 2R1–2R4, described above, show examples of using information pointers in connection with dialog box controls. If the object is not a dialog box control, a test is made to determine if the object is a toolbar button (step 160). If the object is a toolbar button, the display information is set to the latest information about the toolbar button (step 162). An example of an information pointer being used to display information about a toolbar button is shown in FIG. 2N, described above. If the object is not a toolbar button, a test is made to determine if the object is the desktop (step 164). If the object is the desktop, the display information is set to the latest information about the desktop (step 166). An example of an information pointer for the desktop is shown in FIG. 2I, described above. If the object is not the desktop, a test is made to determine if the object is a user-defined object (step 168). If the object is a user-defined object, the display information is set to the latest information about the user-defined object (step 170). An example of a user-defined object is shown in FIG. 2H, described above.

Returning to FIG. 4B, an alternative way of obtaining display information about the source object in a drag and drop operation, as depicted in detail in FIG. 2T, is to not display any information about the source object, until an impending action with a possible target object occurs, regardless of the display format of the information pointer. Alternatively, the name of the source object is output regardless of the display format of the information pointer. After the display information for the source object has been obtained (step 90), the display information is formatted according to the display format (step 80) as described above.

In FIG. 4B, if multiple objects are not selected ("no" on step 76) and this is not a drag and drop operation ("no" on step 82), information about the individual object to which the cursor is currently pointing is obtained (step 90). Step 90 is described above in connection with a source object of a drag and drop operation. After the display information for the object has been obtained (step 90), the display information is formatted according to the display format (step 80). Step 80 is described above in conjunction with the selection of multiple objects.

Returning to FIG. 4A, after the window procedure has determined the message based on what is at the specified cursor position (step 59), the procedure passes a message to the operating system 22 (FIG. 1) that tells the operating system what type of cursor to display and sets forth the contents and type of information to be output (step 58). The information to be output, as determined in step 59, may be textual data, other video data and/or audio data. Suppose that the application program desires to display a name cursor 26 (FIG. 2A). A message requesting that a name cursor be displayed is passed to the operating system 22 along with a text string for the name to be displayed in the name box 30. If audio data is output, the audio data is also passed to the operating system.

Whether the information pointer is displayed depends upon whether the information pointer is designated as "On" or "Off." The operating system checks whether the information pointer is "On" (step 60 of FIG. 4A). In certain instances, the user may have the option of specifying whether the information pointer is "On" or "Off." Alternatively, the information pointers may be programmed by the application program or operating system 22 (FIG. 1) such that they are automatically turned "On" when the cursor points to a named entity. This latter option provides an automatic mechanism for switching "On" or "Off" the information pointer. The output of audio information may also be turned "On" or "Off" as may the output of video data. If the information pointer is not "On," it must be determined if the information is critical in nature (step 63). If the information is not critical, and the information pointer is "Off," a conventional cursor is displayed (step 64). As an example, consider the name cursor 26. If the name information pointer 26 is "Off," the name information box 30 is not displayed and no audio information is output (FIG. 2A). Instead, a conventional cursor is displayed. On the other hand, if the name information pointer is "on," or the information is critical, the pointing portion 28 is displayed along with the appropriate name information to be used in the name information box and/or appropriate audio output (step 62 of FIG. 4A).

Figure 4G:
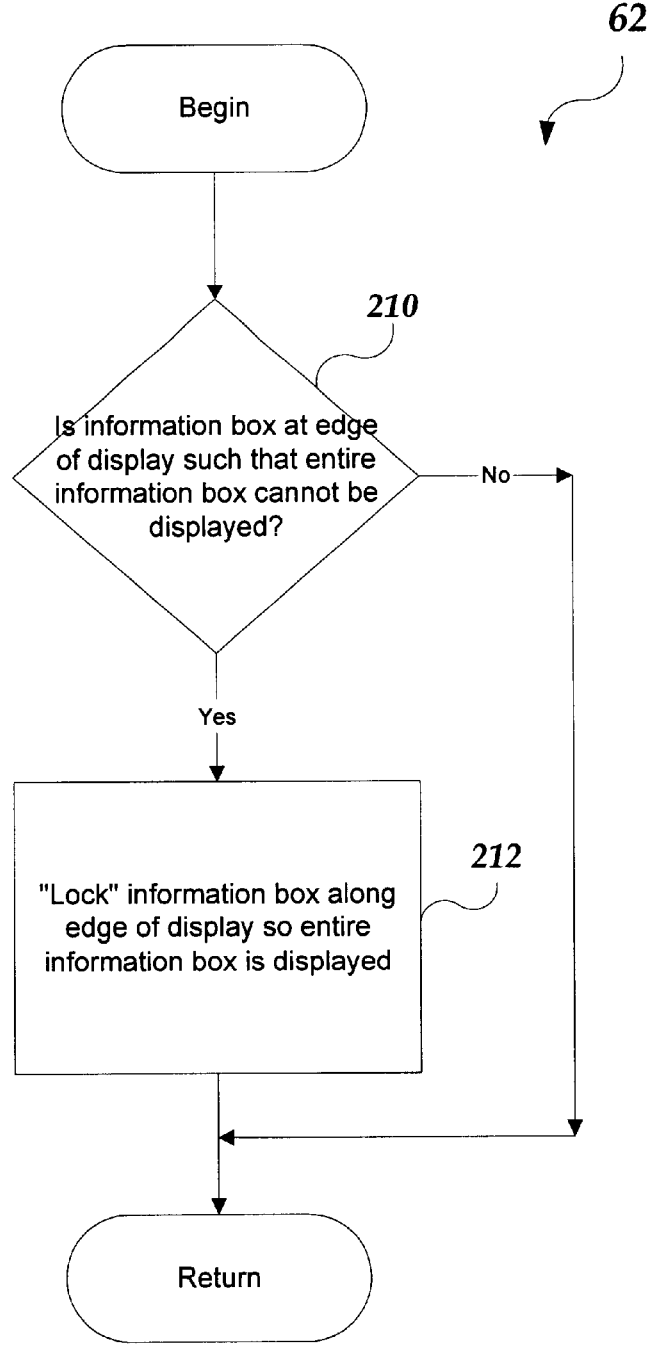
FIG. 4G is a flow chart illustrating in more detail how a cursor is displayed along with an information box in accordance with the present invention.

FIG. 4G is a flow chart showing in more detail the steps performed in order to accomplish step 62 of FIG. 4A of displaying the cursor with an information box adjacent to the cursor. A test is made to determine if the information box can be completely displayed at the default position relative to the cursor (step 210). If the information box cannot be fully displayed at its default location, the information box is moved to a location near the cursor where it can be fully displayed (step 212). In one embodiment of the present invention, the information box defaults to a location southeast of the cursor. If at its default location the information pointer cannot fully be displayed, the information box "locks" on the encountered edge of the display. If audio information pointers are in use, an audio indication may also be given that the cursor has encountered an edge of the video display 20. Returning to FIG. 4A, the display of the cursor with an information box (step 62) or the display of a standard cursor without an information box (step 64) completes the logic necessary to output information about the object to which the cursor is pointing (step 56 of FIG. 3) and also completes logic for the processing for a message generated when a cursor moves into a window (FIG. 3).

A specific example of an embodiment of information pointers is a Quick Info Window. FIG. 5 shows an example of a Quick Info Window 270 for a toolbar button 272. In the example shown in FIG. 5, the toolbar button 272, is a Justified Text Button. Each Quick Info Window 270 provides context sensitive information about an object (in this case a toolbar button 272) that is pointed to by an arrow 274. The information provided within the Quick Info Window 270 is provided by the object 272 to which the arrow 274 points. Each Quick Info Window 270 displays the object name 276. In the example shown in FIG. 5, the object name is "Justified Text Button." The Quick Info Window 270 also provides a description of the object. In the example shown in FIG. 5, the description of the object includes text 278 which specifies the purpose of the object and text 280 which specifies how to use the object. In this example, in contrast to the examples shown in FIGS. 2A–2S, the standard cursor appears to be replaced by an arrow. The reason that there is an arrow 274 pointing to the object in this example is to indicate which object the Quick Info Window refers to and to free up the cursor so that it can be used to navigate within the Quick Info Window 270.

The Quick Info Window 270 also includes two pushbuttons: a More Help pushbutton 282, and a Close pushbutton 284. The More Help pushbutton 282, when activated, provides additional help information for the object 272. The Close pushbutton 284, when activated, closes the Quick Info Window 270.

The operating system 22 (FIG. 1) provides Quick Info Windows for a number of different types of objects that appear on the screen of the video display 20. These objects include menubars, context menus, toolbars, palettes, dialog box controls, property sheets, forms, files, folders, links and other window elements, such as Min/Max buttons.

Quick Info Windows 270 may be accessed in two complimentary ways: in riffing mode and not in riffing mode. Riffing mode is a mode wherein any time the user points with a cursor to an object that supports a Quick Info Window, the Quick Info Window for the object is generated. Riffing is explicitly turned "On" and "Off" by the user. When riffing mode is "Off," if the user wishes to generate a Quick Info Window, he must take additional steps other than positioning the cursor over an object.

Figure 6A:
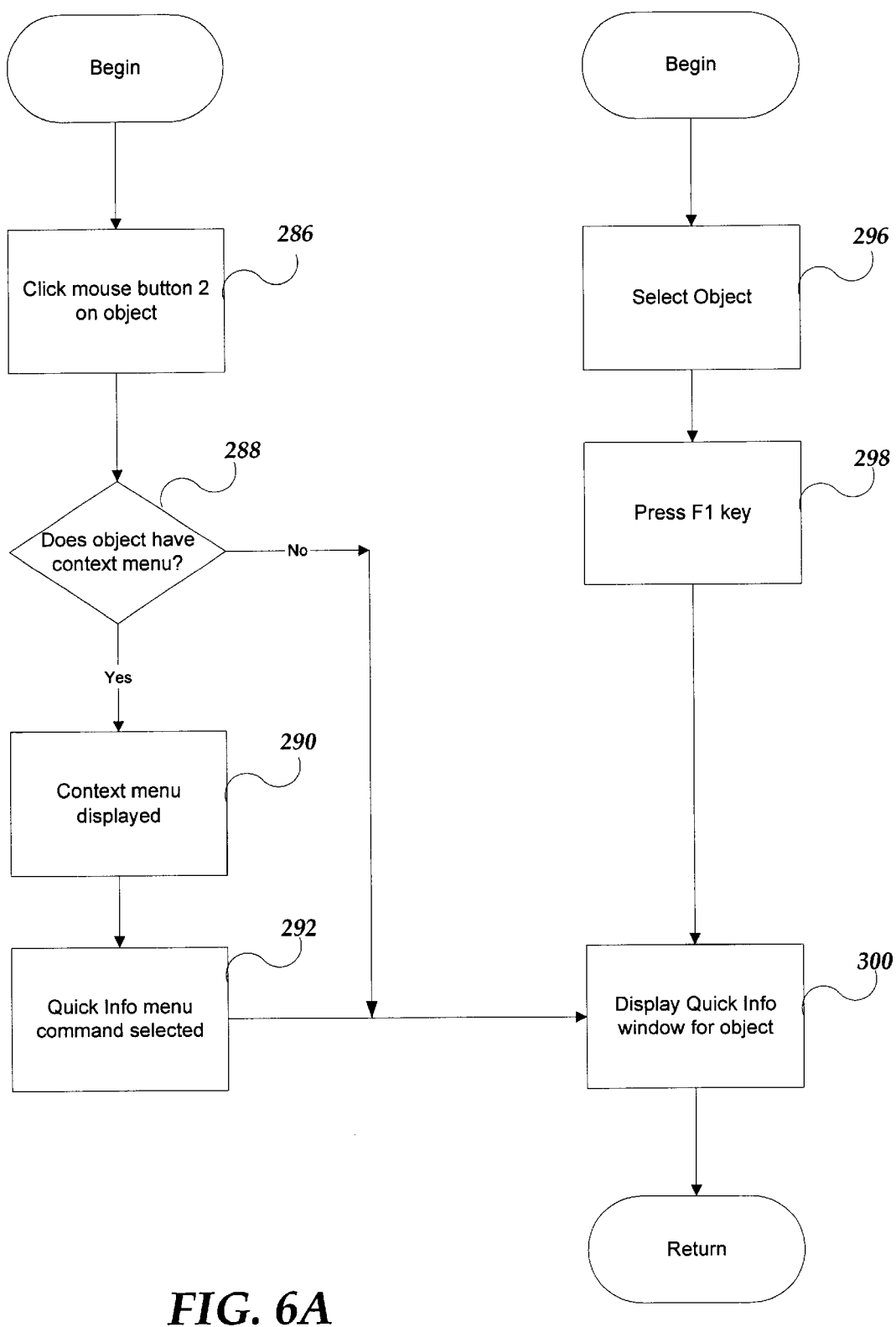
FIG. 6A is a flow chart showing the steps performed to access a Quick Info Window without entering riffing mode.

FIG. 6A is a flow chart showing the steps that may be used to access a Quick Info Window 270 when not operating in riffing mode. A first option is for a user to position a cursor with the mouse 18 (FIG. 1) over an object and to press button 2 (typically the right button) of the mouse (step 286 in FIG. 6A). A determination is then made whether the object has a context menu (step 288). If the object has a context menu, the context menu is displayed (step 290). The context menu includes a "Quick Info" menu command. The Quick Info menu command is then selected (step 292). As a result, the Quick Info Window for the object is displayed (step 300). On the other hand, if at step 288 it is determined that the object does not have a context menu, the Quick Info Window for the object is displayed without first producing a context menu (step 300).

Another option that may be used to access a Quick Info Window when not in riffing mode is to first select the object using the keyboard 16 or mouse 18 (step 296). The F1 key on the keyboard 16 then may be pressed (step 298). The F1 key is programmed by the operating system 22 to provide context-sensitive help information. After the F1 key is pressed, the Quick Info Window is displayed in proximity to the object (step 300).

Figure 6B:
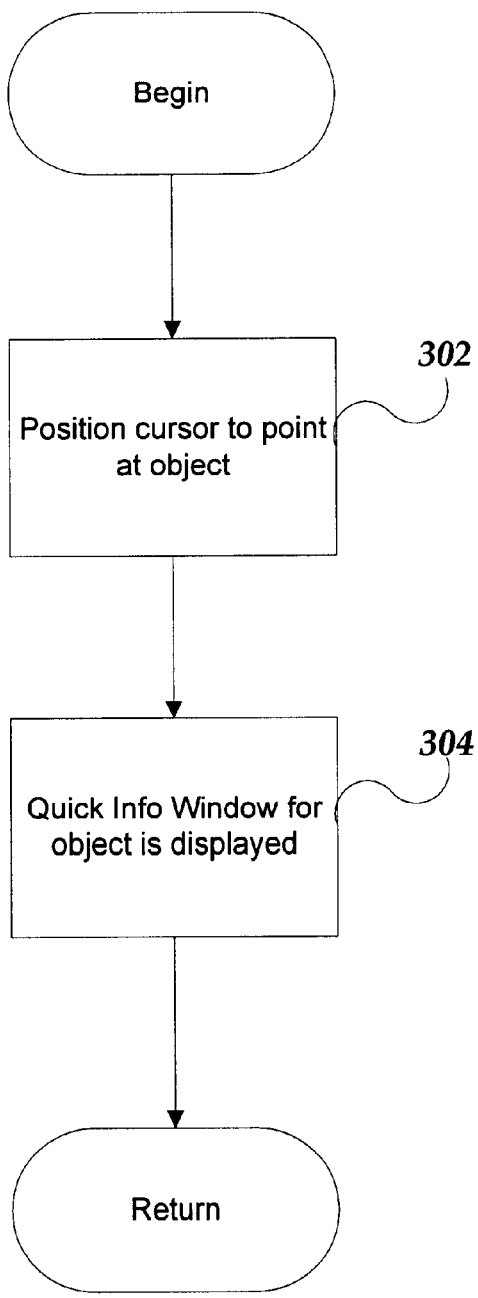
FIG. 6B is a flow chart illustrating the steps performed to access a Quick Info Window in riffing mode.

A Quick Info Window 270 may also be generated in riffing mode. The primary goal of riffing mode is to help less experienced or curious users to learn more about objects. FIG. 6B is a flow chart illustrating the steps performed to access a Quick Info Window 270 when riffing mode is turned "on." In particular, the cursor is positioned to point at an object (step 302). When the cursor points to an object that supports a Quick Info Window, the Quick Info Window 270 is displayed for the object (step 304). When a user moves the cursor over an object other than the object for which a previous Quick Info Window was generated, the Quick Info Window is repositioned near the new object and the contents of the Quick Info Window are updated to reflect the information for the new object.

When operating in riffing mode, a user may select the More Help pushbutton 282 or the close pushbutton 284 by moving the cursor pointer near or along the arrow 274. This allows the user to move the pointing portion of the cursor inside the Quick Info Window 270 without bringing up additional Quick Info Windows. Hence, a sort of "safety zone" is provided.

Figure 6C:
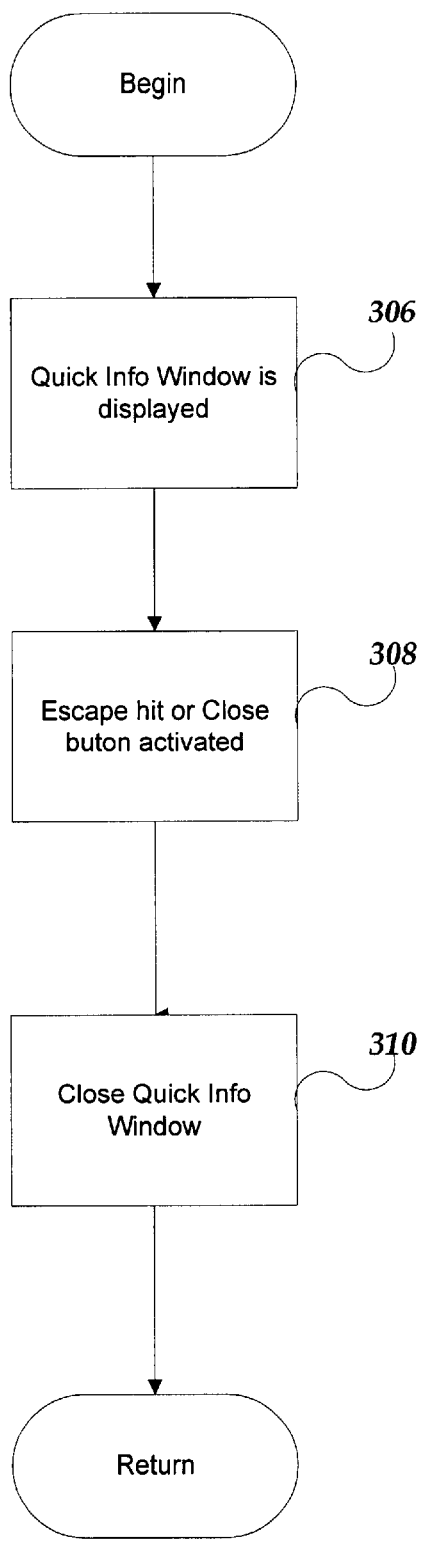
FIG. 6C is a flow chart showing the steps performed to close a Quick Info Window.

After a user has generated a Quick Info Window 270, he may wish to later close the Quick Info Window. FIG. 6C is a flow chart of the steps performed to close a Quick Info Window 270. Initially, a Quick Info Window 270 is displayed on the video display 20 (step 306). The user then hits the escape button on the keyboard 16 or, alternatively, hits the close pushbutton 284 (FIG. 5) within the Quick Info Window 270 (step 308 in FIG. 6C). In response to these steps, the Quick Info Window is closed (step 310).

Figure 6D:
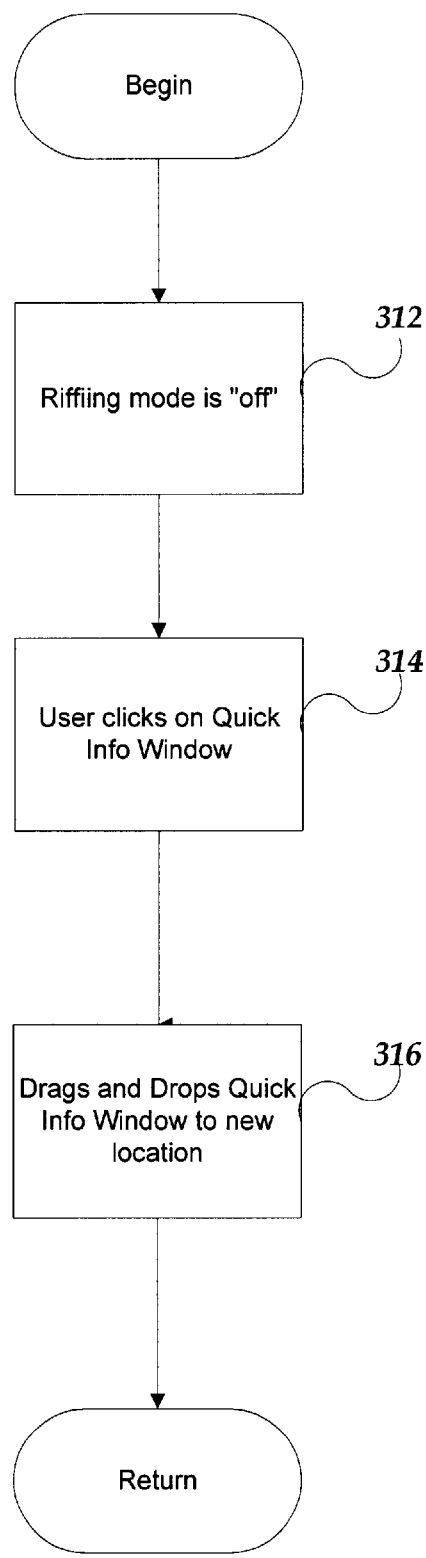
FIG. 6D is a flow chart illustrating the steps performed to move a Quick Info Window.

Quick Info Windows may be moved about the video display 20 (FIG. 1) when not in riffing mode. However, when in riffing mode, the Quick Info Window 270 may not be moved. FIG. 6D is a flow chart showing the steps that are performed to move a Quick Info Window. The riffing mode must be designated as "Off" (step 312), The user then positions the cursor using the mouse 18 (FIG. 1) to point to a location in the Quick Info Window 270 and depresses a designated one of the mouse buttons (step 314). While keeping the button depressed, the user drags the mouse to reposition the Quick Info Window at a new location and drops the Quick Info Window at the new location (step 316). When the Quick Info Window 270 is dragged, the arrow 274 connecting it to the object 272 of interest is removed.

The size of a Quick Info Window depends upon the amount of text being displayed within the window. The width of the Quick Info Window is fixed, whereas the height of the Quick Info Window grows to display as much text as required. The window height is bounded by the size of the video display 20. The arrow 274 associated with the Quick Info Window 270 has a length based upon where the Quick Info Window 270 is positioned on the screen and the amount of space between the Quick Info Window 270 and the object 272 of interest.

It should be appreciated that more than one Quick Info Window 270 may be displayed on the video display 20 simultaneously. It should also be appreciated that the font size and type of textual information provided within the Quick Info Window 270 may be varied from the default font, which is MS San Serif 8.

Figure 7A:
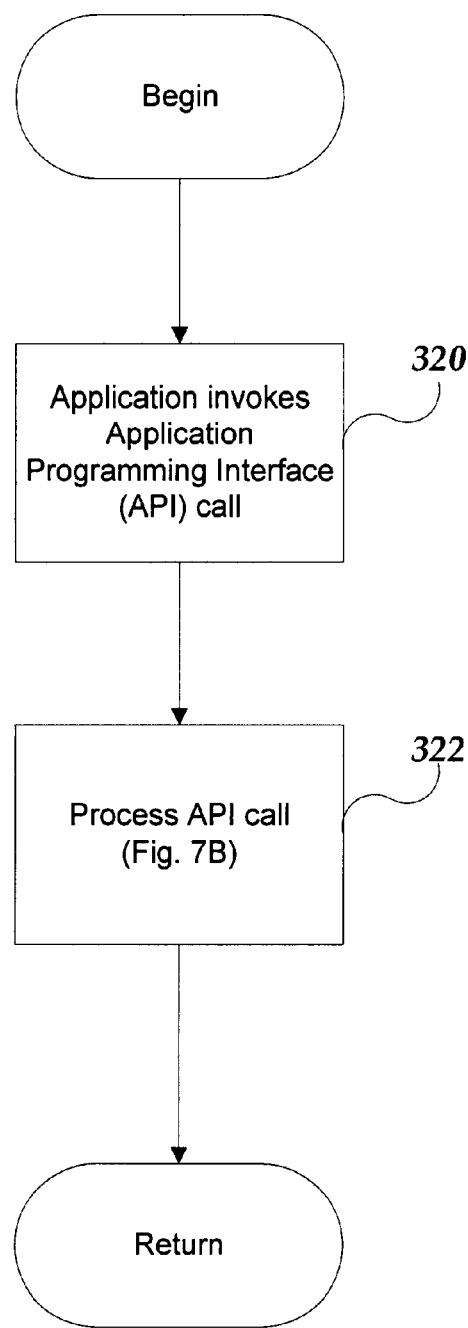
FIG. 7A is a flow chart showing the steps performed to implement the Application Programming Interface (API) of the present invention.

Since applications, as well as the operating system, can modify the contents of the information pointer, the applications need a method for accessing the information pointer. The mechanism by which the applications access the information pointer is an Application Programming Interface (API). FIG. 7A is a flowchart illustrating the use of the API for information pointers. The application makes a request through an API call (step 320). The operating system then processes the API call (step 322).

Figure 7B:
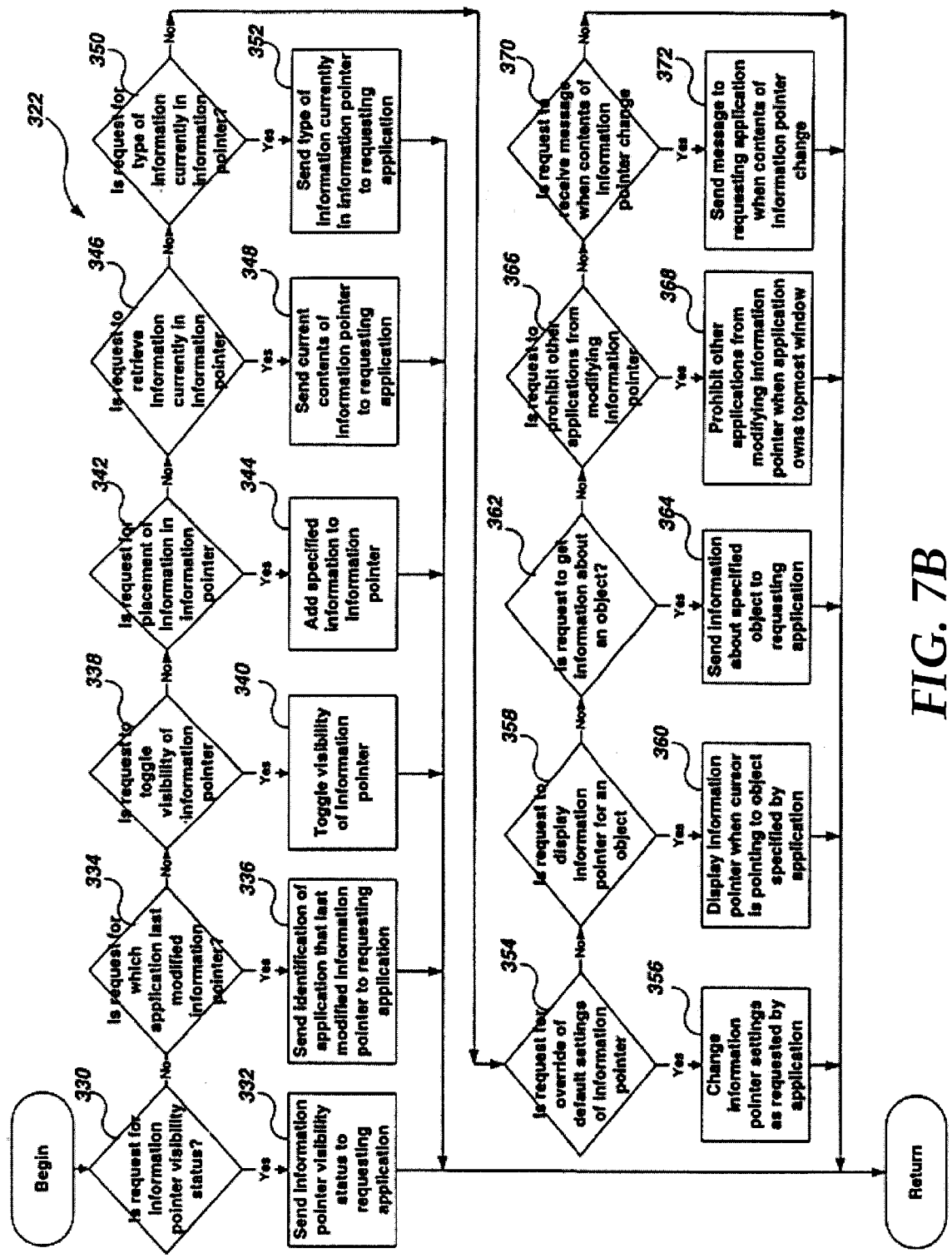
FIG. 7B is a flow chart illustrating in more detail the steps performed to process a requested API call of the present invention.

FIG. 7B is a flowchart showing in more detail the steps performed in order to realize step 322 of FIG. 7A of processing the API call. If the API call is a request for the visibility status of the information pointer (step 330), the information pointer visibility status is sent to the requesting application (step 332). If the API call is a request for which application last modified the information pointer (step 334), the identification of the application that last modified the information pointer is sent to the requesting application (step 336). If the API call is a request to toggle the visibility of the information pointer (step 338), the visibility of the information pointer is toggled (step 340). If the API call is a request to place information in the information pointer (step 342), the specified information will be added to the contents of the information pointer (step 344). If the API call is a request to retrieve the information currently in the information pointer (step 346), the current contents of the information pointer will be sent to the requesting application (step 348). If the API call is a request for the type of information currently in the information pointer (step 350), the type of information (i.e., name, preview, etc.) will be sent to the requesting application (step 352). If the API call is a request to override the default settings of the information pointer (step 354), the information pointer settings will be changed as requested by the application (step 356). Examples of information pointer settings include color and font. If the API call is a request to display the information pointer for a specified object (step 358), the information pointer, as specified, will be displayed when the cursor is pointing to the object specified by the application (step 360). If the API call is a request to get information about a specified object (step 362), the information about the specified object is sent to the requesting application (step 364). The specified object is not necessarily the object to which the cursor is currently pointing. The object may be specified by other means, such as, display coordinates. If the API call is a request to prohibit other applications from modifying the information pointer (step 366), other applications will be prohibited from modifying the information pointer when the application owns the topmost window (step 368). And finally, if the API call is a request to receive a message when the contents of the information pointer changes (step 370), a message will be sent to the requesting application when the contents of the information pointer changes (step 372).

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a data processing system having a video display, an output device, and an input device, a method for providing an information pointer, comprising:
   (a) displaying a cursor on the video display;
   (b) displaying one or more objects on the video display;
   (c) in response to a user using the input device, positioning at least a part of the cursor over at least a portion of a selected one of the objects that are displayed;
   (d) in response to at least a part of the cursor being positioned over at least a portion of the selected object, outputting dynamic information about a further action with the selected object over the output device;
   (e) allowing the user to select to turn off the outputting of the dynamic information; and
   (f) overriding the user's ability to turn off the displaying of critical information.

2. In a data processing system having a video display, an output device, and an input device, a method for providing an information pointer, comprising:
   (a) displaying a cursor on the video display;
   (b) displaying one or more objects on the video display;
   (c) in response to a user using the input device, positioning at least a part of the cursor over at least a portion of a selected one of the objects that are displayed;
   (d) in response to at least a part of the cursor being positioned over at least a portion of the selected object, outputting dynamic textual information about the selected object itself over the output device;
   (e) allowing the user to select to turn off the outputting of the information; and
   (f) overriding the user's ability to turn off the displaying of critical information.

* * * * *

UNITED STATES PATENT AND TRADEMARK OFFICE
CERTIFICATE OF CORRECTION

PATENT NO. : 6,606,101 B1
DATED : August 12, 2003
INVENTOR(S) : M.A. Malamud et al.

It is certified that error appears in the above-identified patent and that said Letters Patent is hereby corrected as shown below:

Title page,
Item [75], Inventors, "Redmond," should read -- Everett, --

Column 5,
Line 56, "FIGS. 21-2N" should read -- FIGS. 2I-2N --

Column 6,
Line 32, "shown FIG. 2C." should read -- shown in FIG. 2C. --

Column 8,
Line 36, "41 C" should read -- 41C --
Lines 54-55, "41 E" should read -- 41E --

Column 12,
Line 41, "pointers In" should read -- pointers. In --

Column 13,
Lines 28 and 33, after "object" delete ","

Column 15,
Lines 1-2, "object
(S)" should not break

Column 16,
Lines 63-64, "determine if or not the" should read -- determine if or if not the --

Signed and Sealed this

Twenty-eighth Day of June, 2005

JON W. DUDAS
*Director of the United States Patent and Trademark Office*